US010547807B2

(12) United States Patent
Yoshida et al.

(10) Patent No.: US 10,547,807 B2
(45) Date of Patent: Jan. 28, 2020

(54) PHOTOELECTRIC CONVERSION APPARATUS AND PHOTOELECTRIC CONVERSION SYSTEM

(71) Applicant: CANON KABUSHIKI KAISHA, Tokyo (JP)

(72) Inventors: Daisuke Yoshida, Ebina (JP); Takashi Muto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 15/754,558

(22) PCT Filed: Aug. 1, 2016

(86) PCT No.: PCT/JP2016/003536
§ 371 (c)(1),
(2) Date: Feb. 22, 2018

(87) PCT Pub. No.: WO2017/033402
PCT Pub. Date: Mar. 2, 2017

(65) Prior Publication Data
US 2018/0288346 A1 Oct. 4, 2018

(30) Foreign Application Priority Data
Aug. 25, 2015 (JP) .................................. 2015-166055

(51) Int. Cl.
H04N 5/378 (2011.01)
H04N 5/363 (2011.01)
(Continued)

(52) U.S. Cl.
CPC ............. *H04N 5/378* (2013.01); *H04N 5/363* (2013.01); *H04N 5/3745* (2013.01); *H04N 5/3575* (2013.01)

(58) Field of Classification Search
CPC ...................................................... H04N 5/378
See application file for complete search history.

(56) References Cited

U.S. PATENT DOCUMENTS

2008/0258047 A1 10/2008 Sakakibara
2011/0273601 A1 11/2011 Egawa
(Continued)

FOREIGN PATENT DOCUMENTS

CN 101510963 A 8/2009
CN 103581581 A 2/2014
(Continued)

*Primary Examiner* — Thanh Luu
(74) *Attorney, Agent, or Firm* — Canon U.S.A., Inc. IP Division

(57) ABSTRACT

The photoelectric conversion apparatus according to an embodiment includes a photoelectric conversion element (PD), a first transistor (Mpx) including a gate that receives a first signal from the photoelectric conversion element (PD), a second transistor (M2), and a third transistor (M3) that selectively constitutes a first differential pair constituted by the first transistor (Mpx) and the third transistor (M3) and a second differential pair constituted by the second transistor (M2) and the third transistor (M3). The photoelectric conversion apparatus outputs a second signal based on a voltage at the gate of the first transistor (Mpx) to a gate of the second transistor (M2).

24 Claims, 9 Drawing Sheets

(51) Int. Cl.
*H04N 5/3745* (2011.01)
*H04N 5/357* (2011.01)

(56) References Cited

U.S. PATENT DOCUMENTS

2012/0286138 A1 11/2012 Yamazaki
2014/0175263 A1 6/2014 Muto
2016/0301886 A1* 10/2016 Muto ..................... H04N 5/378

FOREIGN PATENT DOCUMENTS

| CN | 103916608 | A | 7/2014 |
| CN | 104079841 | A | 10/2014 |
| JP | 2005-311487 | A | 11/2005 |
| JP | 2008-271280 | A | 11/2008 |
| JP | 2011-239068 | A | 11/2011 |

* cited by examiner

[Fig. 1]
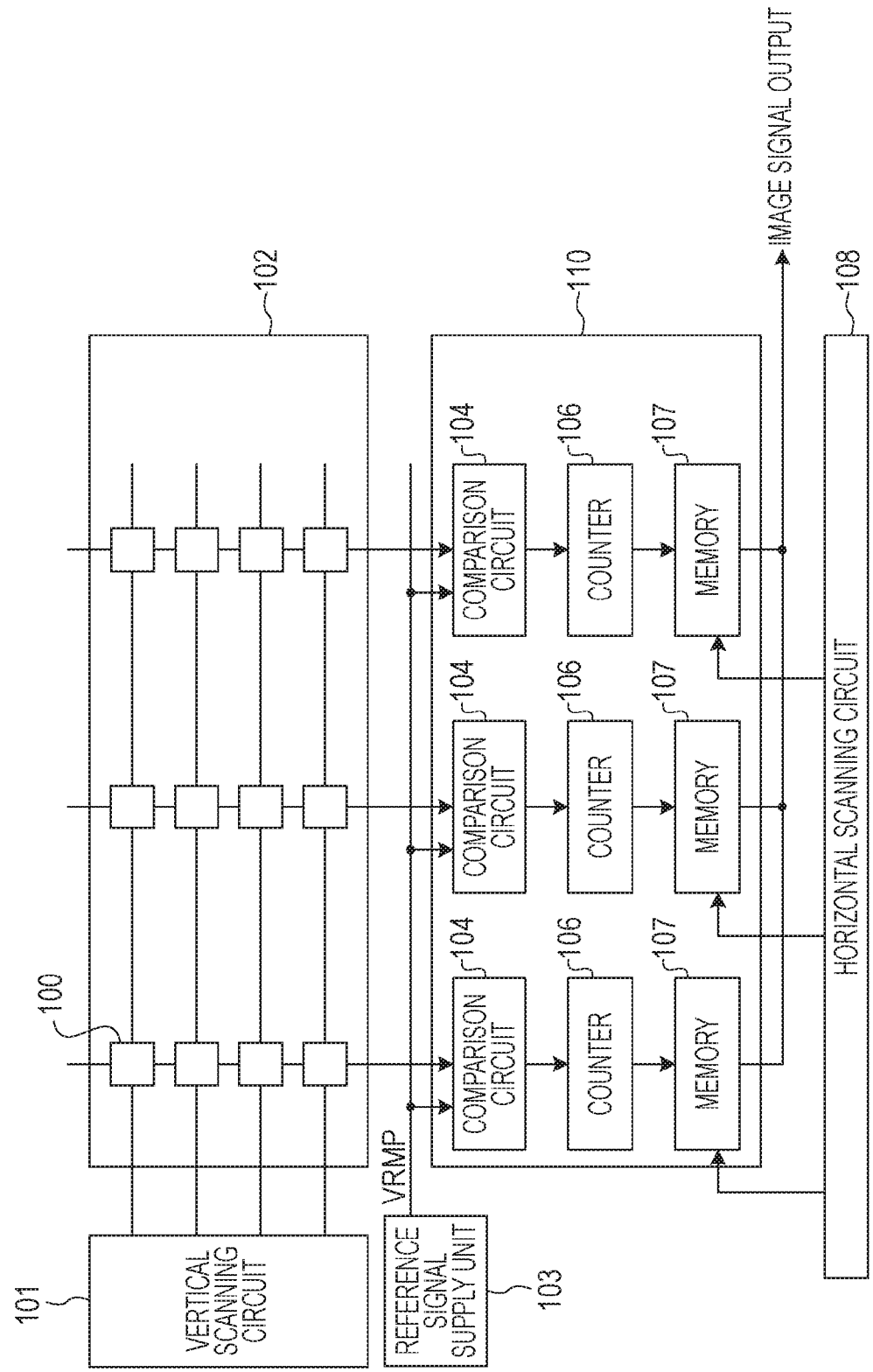

[Fig. 2]
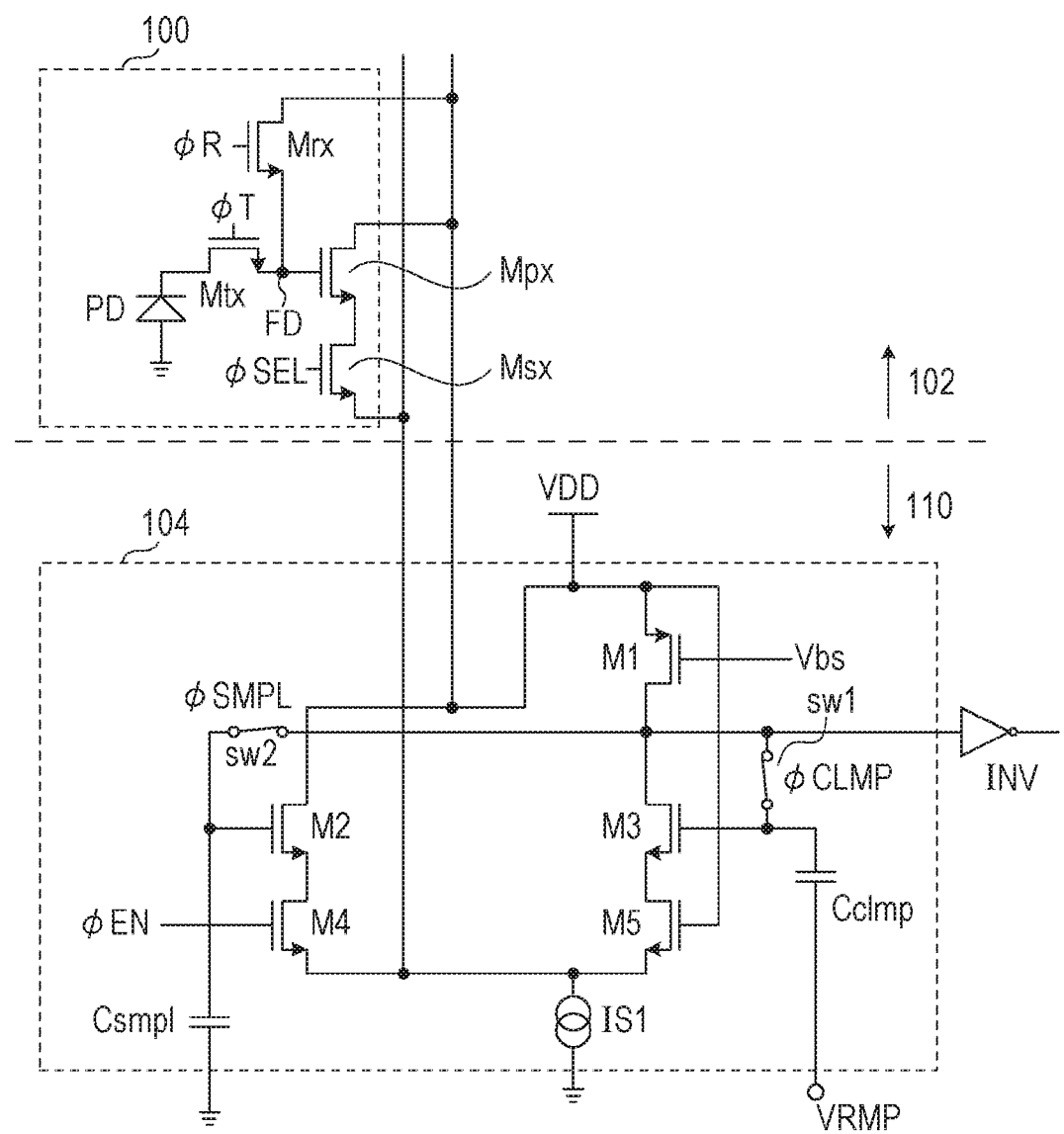

[Fig. 3]
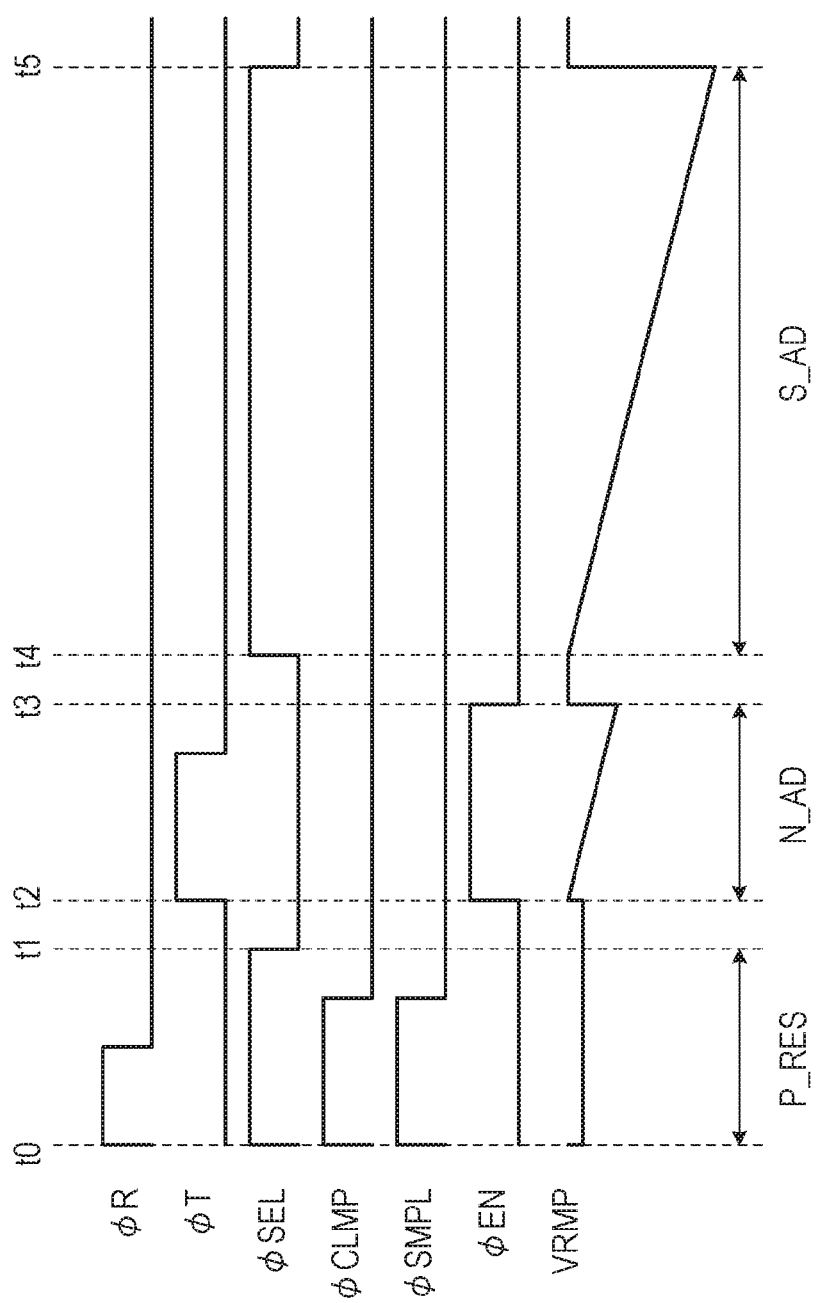

[Fig. 4]
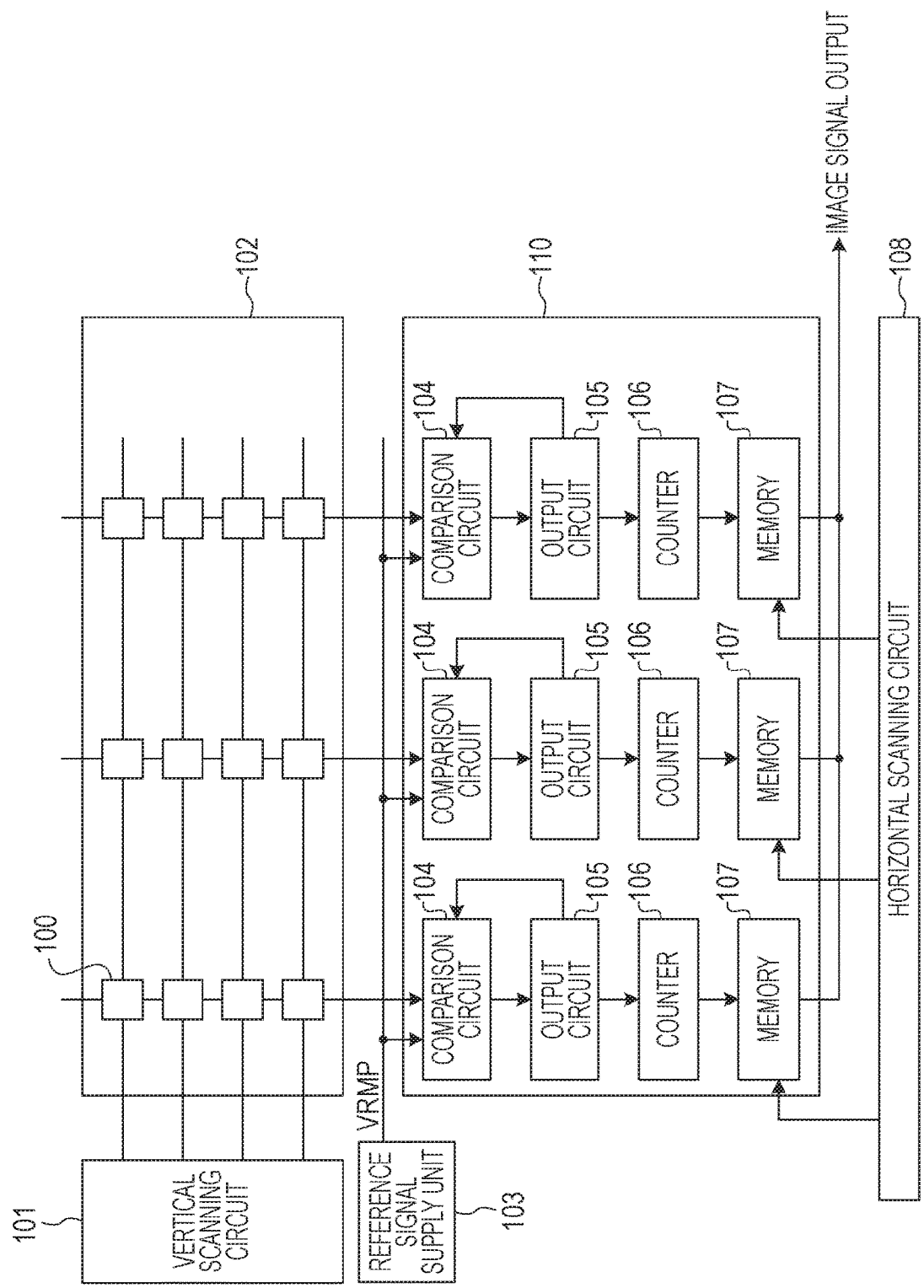

[Fig. 5]
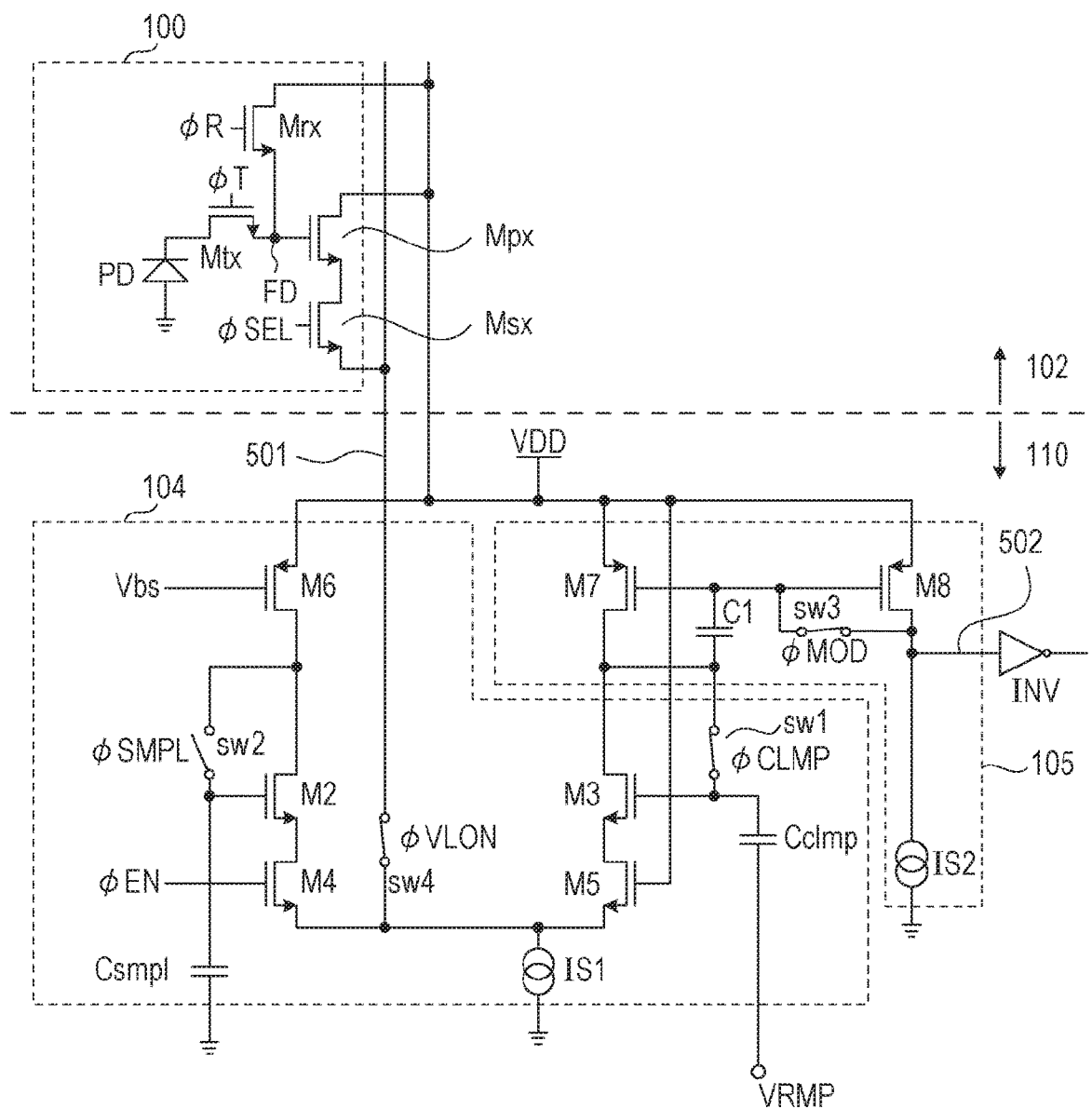

[Fig. 6]
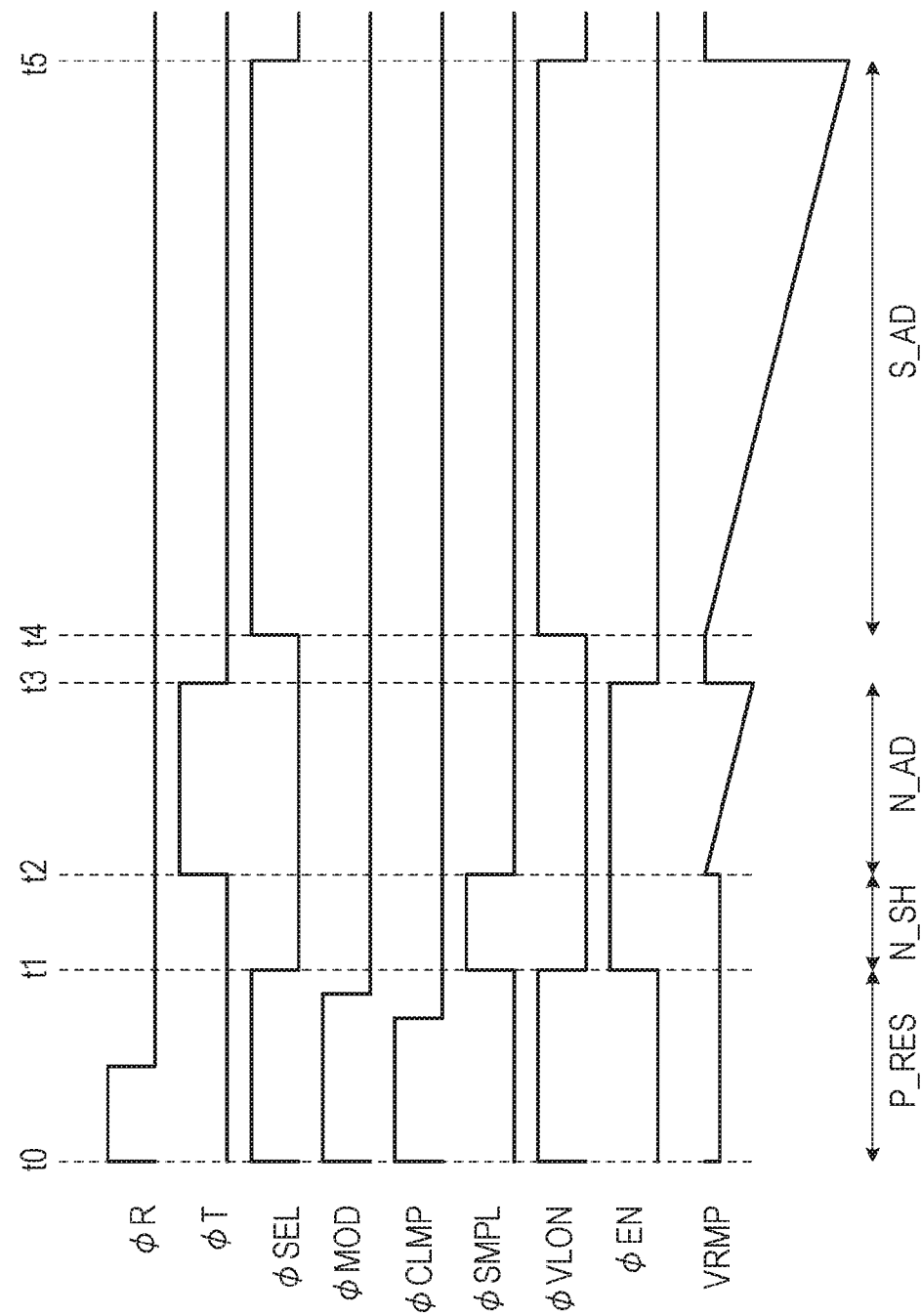

[Fig. 7]
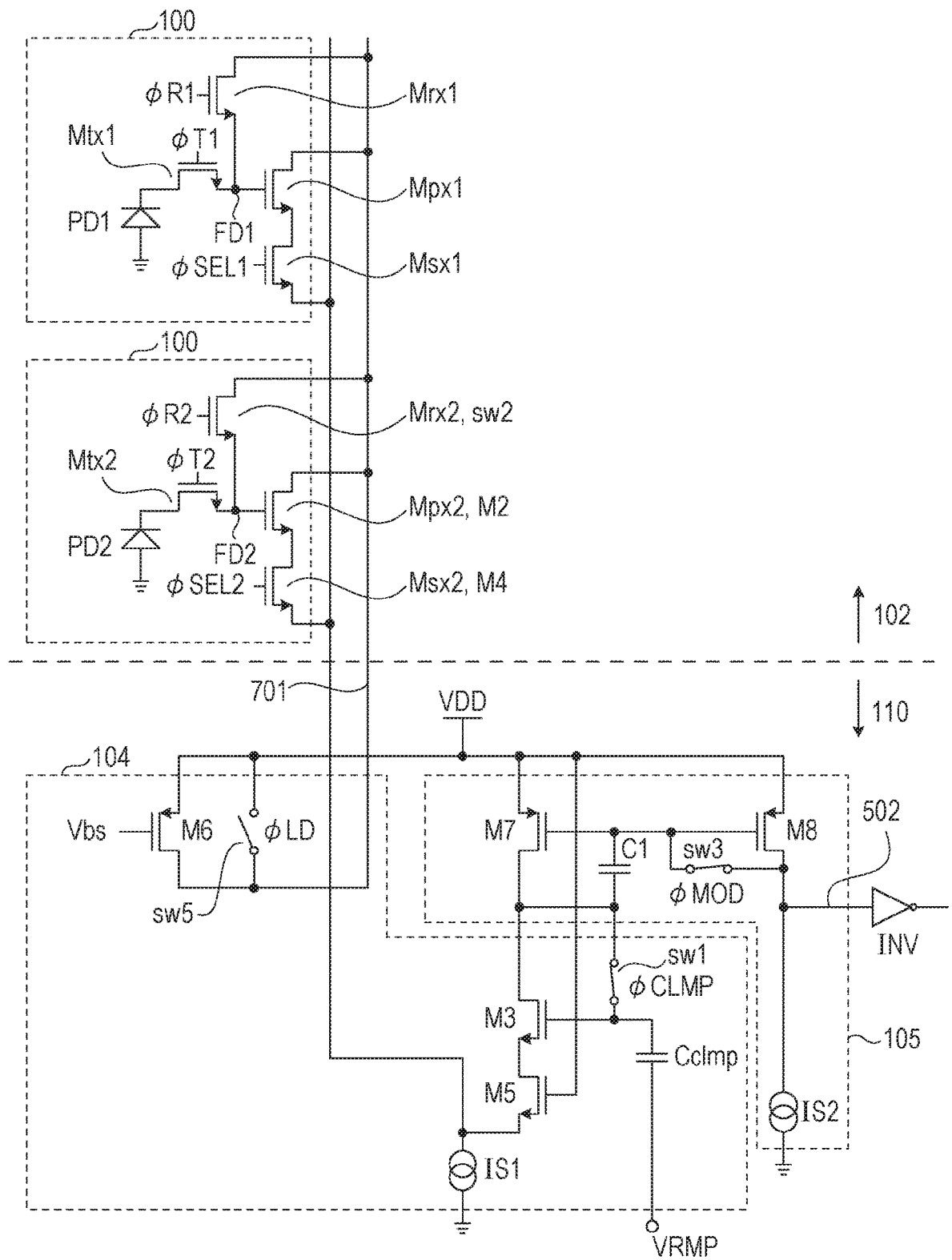

[Fig. 8]
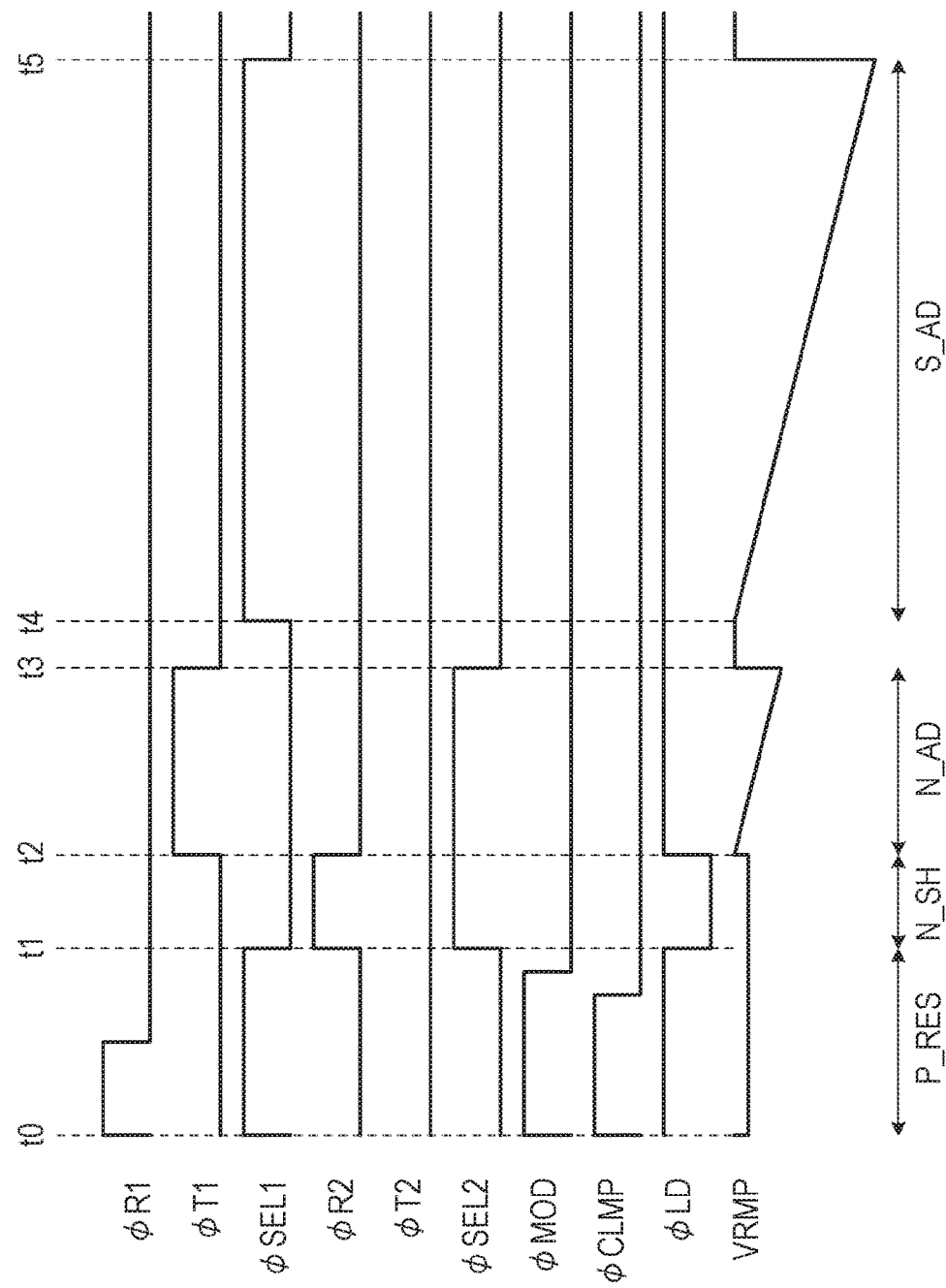

[Fig. 9]
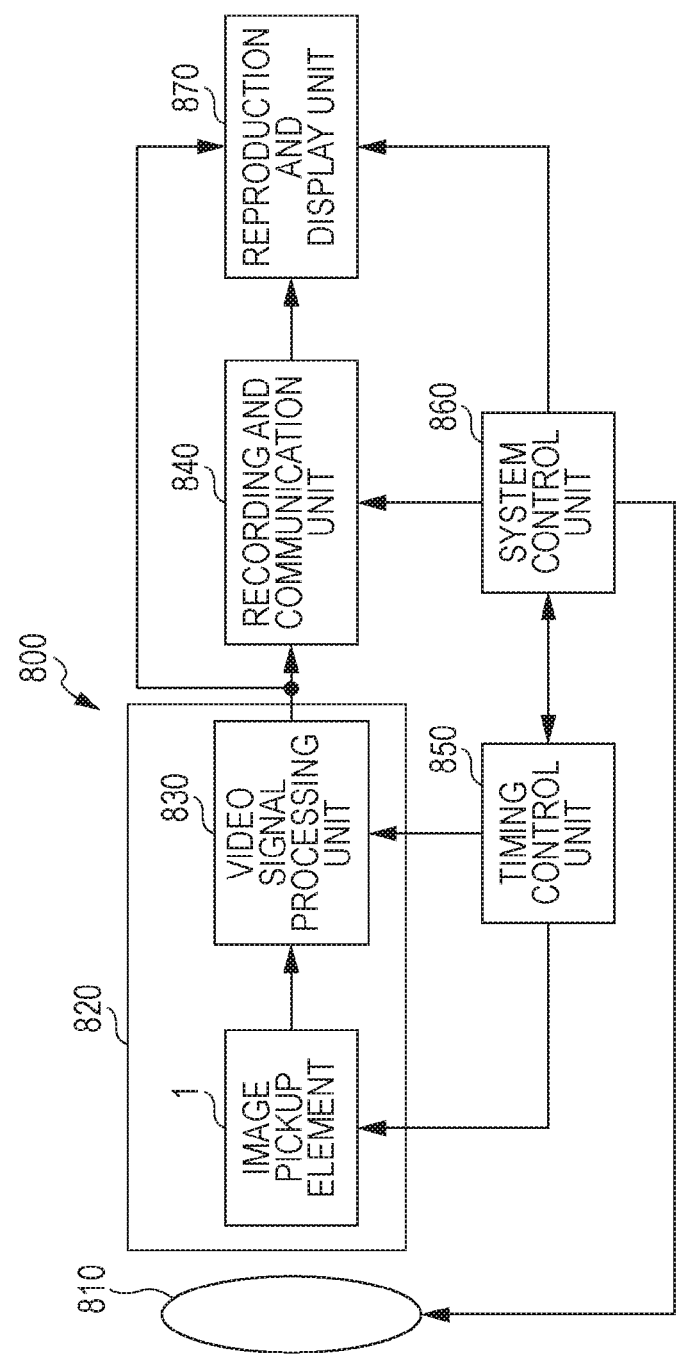

PHOTOELECTRIC CONVERSION APPARATUS AND PHOTOELECTRIC CONVERSION SYSTEM

TECHNICAL FIELD

The present invention relates to a photoelectric conversion apparatus and a photoelectric conversion system.

BACKGROUND ART

In a photoelectric conversion apparatus described in FIG. 2 of PTL 1, an amplification transistor (which is denoted by a reference symbol 114 in FIG. 2) of a pixel and a differential transistor (which is denoted by a reference symbol 201 in FIG. 2) arranged in each column constitute a differential amplifier. A signal based on charges generated in a photoelectric conversion element is input to the amplification transistor of the pixel. A reference voltage having a ramp waveform is input to the differential transistor. Then, through an operation of comparing a voltage at a gate of the amplification transistor of the pixel with a voltage at a gate of the differential transistor, the signal based on the charges generated in the photoelectric conversion element is converted into a digital signal.

CITATION LIST

Patent Literature

PTL 1: Japanese Patent Laid-Open No. 2005-311487

SUMMARY OF INVENTION

An image pickup apparatus according to an aspect of the present invention includes a photoelectric conversion element, a first transistor including a gate that receives a first signal from the photoelectric conversion element, a second transistor, and a third transistor that selectively constitutes a first differential pair constituted by the first transistor and the third transistor, and a second differential pair constituted by the second transistor and the third transistor. A second signal based on a voltage at the gate of the first transistor is output to a gate of the second transistor.

An image pickup apparatus according to another aspect of the present invention includes a photoelectric conversion element, a first transistor including a gate that receives a signal from the photoelectric conversion element, a second transistor, a third transistor that selectively constitutes a first differential pair constituted by the first transistor and the third transistor, and a second differential pair constituted by the second transistor and the third transistor, and includes a gate that receives a reference signal, and a switch that connects a gate of the second transistor and a drain of the third transistor.

An image pickup apparatus according to still another aspect of the present invention includes a photoelectric conversion element, a first transistor including a gate that receives a first signal from the photoelectric conversion element, a reset transistor that resets a voltage at the gate of the first transistor, a second transistor, and a third transistor including a gate that receives a reference signal used for an analog-to-digital conversion, in which a comparator including a first differential pair constituted by the first transistor and the third transistor performs a comparison between the first signal and the reference signal, and a comparator including a second differential pair constituted by the second transistor and the third transistor performs a comparison between a second signal on the basis of the voltage at the gate of the first transistor when the voltage at the gate of the first transistor is reset and the reference signal.

Further features of the present invention will become apparent from the following description of exemplary embodiments with reference to the attached drawings.

BRIEF DESCRIPTION OF DRAWINGS

FIG. 1 is a block diagram schematically illustrating an overall configuration of a photoelectric conversion apparatus.

FIG. 2 illustrates a circuit configuration of the photoelectric conversion apparatus.

FIG. 3 schematically illustrates a timing chart of driving signals of the photoelectric conversion apparatus.

FIG. 4 is a block diagram illustrating an overall configuration of the photoelectric conversion apparatus.

FIG. 5 illustrates a circuit configuration of the photoelectric conversion apparatus.

FIG. 6 schematically illustrates a timing chart of driving signals of the photoelectric conversion apparatus.

FIG. 7 illustrates a circuit configuration of the photoelectric conversion apparatus.

FIG. 8 schematically illustrates a timing chart of driving signals of the photoelectric conversion apparatus.

FIG. 9 illustrates a configuration of a photoelectric conversion system.

DESCRIPTION OF EMBODIMENTS

According to some exemplary embodiments, it is aimed at improving the degree of freedom for a readout operation of a signal in a photoelectric conversion apparatus.

The photoelectric conversion apparatus has an issue of a restriction on the readout operation of the signal from a pixel. In a photoelectric conversion apparatus known to the inventors, to perform an analog-to-digital conversion (hereinafter, will be referred to as an AD conversion) with respect to a signal of a predetermined pixel, a differential pair constituted by an amplification transistor of the predetermined pixel and a differential transistor needs to be used.

When the above-described restriction on the readout operation exists, for example, it may be difficult to read out the signal at a high speed in some cases. Resetting of the pixel, AD conversion of a reset signal, transfer of charges, and AD conversion of an optical signal based on the transferred charges need to be sequentially performed. For this reason, the readout of the signal takes time.

As an alternative to the above, the above-described restriction on the readout operation may become a cause of a decrease in an image quality in some cases. According to a related-art technology described in PTL 1, differential amplifiers constituted by different transistors perform AD conversion with respect to a plurality of signals from a plurality of pixels. In a case where characteristics of the amplification transistors vary among the plurality of pixels, the characteristic variation may generate noise in the signals from the pixels as noise in some cases.

An exemplary embodiment of the present invention will be described with reference to the drawings. FIG. 1 is a block diagram schematically illustrating an overall configuration of a photoelectric conversion apparatus according to the present exemplary embodiment. A plurality of pixels 100 constitute a pixel array 102. The pixel array 102 includes a plurality of pixel rows and a plurality of pixel columns. A vertical scanning circuit 101 controls the plurality of pixels 100 to read out signals from the plurality of pixels 100. The signals from the plurality of pixels 100 are read out for each pixel row, for example. An example of the readout of the signal in the present specification includes, at least, an analog-to-digital conversion (hereinafter, will be referred to as an AD conversion) for converting the signal to a digital signal and a comparison of the signals for the AD conversion.

A comparison circuit 104 compares the signal of the pixel 100 with a reference signal. The reference signal generated by a reference signal supply unit 103 is input to the comparison circuit 104. A control signal based on a result of the comparison by the comparison circuit 104 is output to a counter 106. The control signal based on the result of the comparison controls a count period of the counter 106. The counter 106 outputs a count value corresponding to a timing when the control signal is received to a memory 107. The count value output to the memory 107 is a digital signal obtained as a result of the AC conversion performed with respect to the signal of the pixel 100. The digital signals held in the memory 107 are sequentially output from the photoelectric conversion apparatus by a horizontal scanning circuit 108. The comparison circuit 104, the counter 106, and the memory 107 are collectively referred to as a column circuit array 110.

FIG. 2 illustrates configurations of the pixel 100 of the photoelectric conversion apparatus and the comparison circuit 104. To simplify the explanation, FIG. 2 illustrates only one pixel 100.

The pixel 100 includes, at least, a photoelectric conversion element PD and a pixel transistor Mpx. A gate of the pixel transistor Mpx is connected to a floating diffusion node (hereinafter, will be referred to as an FD node). A signal from the photoelectric conversion element PD is input to the gate of the pixel transistor Mpx. For example, charges generated in the photoelectric conversion element PD are transferred to the FD node. That is, a signal based on the charges generated in the photoelectric conversion element PD is input to the gate of the pixel transistor Mpx. It should be noted that, since the gate of the pixel transistor Mpx is connected to the FD node, in the present specification, the gate of the pixel transistor Mpx may be referred to as the FD node in some cases.

The comparison circuit 104 includes a differential transistor M3. A reference signal VRMP used for the AD conversion is input to a gate of the differential transistor M3. The reference signal VRMP is, for example, a ramp voltage signal in which a voltage changes over time.

The pixel transistor Mpx and the differential transistor M3 are connected to a tail current source IS1. In other words, the pixel transistor Mpx and the differential transistor M3 constitute a differential pair. The pixel transistor Mpx and the differential transistor M3 have the same conductivity type.

The photoelectric conversion apparatus according to the present exemplary embodiment is provided with a transistor M2. According to the exemplary embodiment illustrated in FIG. 2, the transistor M2 is included in the comparison circuit 104. The transistor M2 and the differential transistor M3 are connected to the tail current source IS1. In other words, the transistor M2 and the differential transistor M3 constitute a differential pair. The transistor M2 has the same conductivity type as that of the pixel transistor Mpx and the differential transistor M3. According to the present exemplary embodiment, the transistor M2 is an N-channel MOS transistor.

The differential transistor M3 selectively constitutes the differential pair together with one of the pixel transistor Mpx and the transistor M2. For example, while a selection transistor Msx of the pixel 100 and a transistor M4 arranged on an electric path between the transistor M2 and the tail current source IS1 are controlled, the differential pair to be activated may be selected. When the selection transistor Msx is turned on, and the transistor M4 is turned off, the differential pair constituted by the pixel transistor Mpx and the differential transistor M3 is activated. At this time, the differential pair constituted by the transistor M2 and the differential transistor M3 is deactivated. When the selection transistor Msx is turned off, and the transistor M4 is turned on, the differential pair constituted by the transistor M2 and the differential transistor M3 is activated. At this time, the differential pair constituted by the pixel transistor Mpx and the differential transistor M3 is deactivated.

The photoelectric conversion apparatus according to the present exemplary embodiment outputs a signal based on the voltage at the gate of the pixel transistor Mpx to a gate of the transistor M2. The signal based on the voltage at the gate of the pixel transistor Mpx includes, at least, a voltage signal obtained by buffering the voltage at the gate of the pixel transistor Mpx and a voltage signal obtained by amplifying the voltage at the gate of the pixel transistor Mpx at a predetermined gain.

According to some exemplary embodiments, the signal is output to the gate of the transistor M2 via a switch sw1 that connects the gate of the transistor M2 to a drain of the differential transistor M3. First, the differential pair constituted by the pixel transistor Mpx and the differential transistor M3 operates as a voltage follower circuit. An input node of the voltage follower circuit is the gate of the pixel transistor Mpx. With the above-described operation, the voltage at the gate of the pixel transistor Mpx is output to the drain of the differential transistor M3. When the switch sw1 that connects the gate of the transistor M2 to the drain of the differential transistor M3 is turned on, the signal based on the voltage at the gate of the pixel transistor Mpx is output to the gate of the transistor M2.

According to another exemplary embodiment, a plurality of differential pairs constituted by the pixel transistor Mpx, the transistor M2, and the differential transistor M3 are sequentially operated, that is, sequentially activated, so that the signal is output to the gate of the transistor M2. First, the differential pair constituted by the pixel transistor Mpx and the differential transistor M3 functions as a first voltage follower circuit. An input node of the first voltage follower circuit is the gate of the pixel transistor Mpx. With the above-described operation, the voltage at the gate of the pixel transistor Mpx is output to the gate of the differential transistor M3. The differential pair constituted by the differential transistor M3 and the transistor M2 operates as a second voltage follower circuit. An input node of the second voltage follower circuit is the gate of the differential transistor M3. The signal held at the gate of the differential transistor M3 is output to the gate of the differential transistor M3 by the second voltage follower circuit.

Next, an effect of the exemplary embodiment will be described. As described above, the signal from the pixel 100 is output to the gate of the transistor M2. According to the above-described configuration, the degree of freedom for the readout of the signal from the pixel 100 is improved. For example, the AD conversion with respect to the signal from the pixel 100 can be performed by using the differential pair constituted by the transistors other than the transistors included in the pixel 100.

With the improvement in the degree of freedom for the readout of the signal, for example, the readout of the signal can be performed in a short period of time. According to some exemplary embodiments, a signal based on the voltage at the gate when the voltage at the gate of the pixel transistor Mpx is reset (hereinafter, will be referred to as a noise signal) and a signal based on the charges generated in the photoelectric conversion element PD (hereinafter, will be referred to as an optical signal) are read out from the pixel 100. First, the noise signal is output to the gate of the transistor M2. As a result, a comparator including the differential pair constituted by the transistor M2 and the differential transistor M3 can perform a comparison between the noise signal and the reference signal, that is, the AD conversion with respect to the noise signal. On the other hand, while the AD conversion with respect to the noise signal is performed, the charges in the photoelectric conversion element PD can be transferred to the gate of the pixel transistor Mpx in the pixel 100. That is, the AD conversion with respect to the noise signal and the transfer of the charges generated in the photoelectric conversion element PD can be performed in parallel. As a result, it is possible to shorten the time used for performing the readout of the signal.

As an alternative to the above, according to some exemplary embodiments, the photoelectric conversion element PD is directly connected to the gate of the pixel transistor Mpx. According to the above-described exemplary embodiment, when the noise signal is output to the gate of the transistor M2, the charges can be accumulated in the photoelectric conversion element PD while the AD conversion with respect to the noise signal is performed. For this reason, a noise component can be removed from the optical signal, and as a result, the noise of the signal output from the photoelectric conversion apparatus can be reduced.

As an alternative to the above, in an image pickup apparatus including the plurality of pixels 100, it is possible to improve the image quality on the basis of the above-described improvement in the degree of freedom for the readout of the signal. The comparator including the differential pair constituted by the transistor M2 and the differential transistor M3 can commonly perform the AD conversion with respect to the plurality of signals from the plurality of pixels 100. As a result, it is possible to improve the image quality.

It should be noted that, although omitted in FIG. 2, one comparison circuit 104 illustrated in FIG. 2 is arranged with respect to the plurality of pixels 100 included in one pixel column. Specifically, sources of the selection transistors Msx of the plurality of pixels 100 are connected to one another and also connected to the tail current source IS1 directly or via the switch. In addition, drains of the pixel transistors Mpx of the plurality of pixels 100 are connected to one another. Then, one differential transistor M3 and the pixel transistor Mpx of each of the plurality of pixels 100 included in one pixel column constitute the differential pair. The photoelectric conversion apparatus may be provided with a plurality of pairs of the above-described pixel columns and the comparison circuits 104.

According to the above-described exemplary embodiment, the differential transistor M3 and each of the pixel transistor Mpx and the transistor M2 of the pixel 100 constitute the differential pair. The transistor M2 does not belong to any of the pixels. For this reason, the charges generated by the photoelectric conversion are not transferred to the gate of the transistor M2.

According to another exemplary embodiment, the differential transistor M3 and only the pixel transistor Mpx included in the plurality of pixels 100 constitute the differential pair. In this case, in the above-described explanation, the pixel transistor Mpx is appropriately replaced with the pixel transistor Mpx1 included in the first pixel 100, and the transistor M2 is appropriately replaced with the pixel transistor Mpx2 included in the second pixel 100. Such another exemplary embodiment is exemplified, for example, with reference to FIG. 7.

Hereinafter, some examples according to the present invention will be described. Unless particularly specified, descriptions of the present exemplary embodiment apply to the entire examples. In addition, part of configurations according to some examples may be replaced with part of another example or may be added to another example.

EXAMPLE 1

A photoelectric conversion apparatus according to Example 1 will be described. FIG. 1 is a block diagram schematically illustrating an overall configuration of the photoelectric conversion apparatus according to the present example. Since the overall configuration of the photoelectric conversion apparatus has been already described, descriptions of FIG. 1 herein will be omitted.

FIG. 2 illustrates configurations of the pixel 100 of the photoelectric conversion apparatus and the comparison circuit 104. To simplify the explanation, FIG. 2 illustrates only one pixel 100.

The pixel 100 includes the photoelectric conversion element PD, a reset transistor Mrx, a transfer transistor Mtx, the pixel transistor Mpx, and the selection transistor Msx. An N-channel MOS transistor is used as the pixel 100. A driving signal φR is input to a gate of the reset transistor Mrx, a driving signal φT is input to a gate of the transfer transistor Mtx, and a driving signal φSEL is input to a gate of the selection transistor Msx.

The gate of the pixel transistor Mpx is connected to the FD node. The gate of the pixel transistor Mpx receives the signal from the photoelectric conversion element PD. According to this example, the charges generated in the photoelectric conversion element PD are transferred to the FD node by the transfer transistor Mtx. That is, the signal based on the charges generated in the photoelectric conversion element PD is input to the gate of the pixel transistor Mpx. The reset transistor Mrx resets the voltage at the gate of the pixel transistor Mpx.

A drain of the pixel transistor Mpx and a drain of the reset transistor Mrx are connected to a power supply node where a power supply voltage VDD is supplied. A source of the pixel transistor Mpx is connected to the tail current source IS1 via the selection transistor Msx. It should be noted that, although not illustrated in FIG. 2, drains of the pixel transistor Mpx of the plurality of pixels 100 included in one pixel column are connected to one another. Sources of the selection transistors Msx of the plurality of pixels 100 included in one pixel column are connected to one another.

The comparison circuit 104 includes a load transistor M1, the transistor M2, the differential transistor M3, the transistor M4, a transistor M5, and the tail current source IS1. The load transistor M1 is a P-channel MOS transistor. The transistor M2, the differential transistor M3, the transistor M4, and the transistor M5 are all an N-channel MOS transistor. For example, an N-channel MOS transistor in which a predetermined bias voltage is applied to a gate may be used as the tail current source IS1.

The load transistor M1 is arranged on an electric path between the drain of the differential transistor M3 and the power supply node. The transistor M4 is arranged on the electric path between the transistor M2 and the tail current source IS1. The transistor M5 is arranged on an electric path between the differential transistor M3 and the tail current source IS1. A bias voltage Vbs is supplied to the load transistor M1. A driving signal φEN is input to a gate of the transistor M4. The gate of the transistor M5 is connected to the power supply node. For this reason, the transistor M5 is regularly on.

The comparison circuit 104 includes the switch sw1 and a clamp capacitance Cclmp. The switch sw1 connects the gate and the drain of the differential transistor M3 to each other. The switch sw1 is controlled by a driving signal φCLMP. One terminal of the clamp capacitance Cclmp is connected to the gate of the differential transistor M3. The reference signal VRMP is input to the other terminal of the clamp capacitance Cclmp. When the switch sw1 is turned off, the gate of the differential transistor M3 becomes electrically floating. As a result, a voltage at the gate of the differential transistor M3 can be clamped to the clamp capacitance Cclmp.

The comparison circuit 104 includes a switch sw2 and a holding capacitance Csmpl. The switch sw2 connects the gate of the transistor M2 to the drain of the differential transistor M3. The switch sw2 is controlled by a driving signal φSMPL. One terminal of the holding capacitance Csmpl is connected to the gate of the transistor M2. The other terminal of the holding capacitance Csmpl is connected to a grounding node. A ground voltage is supplied to the grounding node. When the switch sw2 is turned off, the gate of the transistor M2 becomes electrically floating. As a result, a signal can be held at the gate of the transistor M2. In other words, the switch sw2 and the holding capacitance Csmpl constitute a sample-and-hold circuit.

An operation mode of the photoelectric conversion apparatus according to the present example will be described. The operation mode of the photoelectric conversion apparatus is controlled by the selection transistor Msx, the transistor M4, the switch sw1, and the switch sw2.

The differential transistor M3 selectively constitutes the differential pair together with each of the pixel transistor Mpx and the transistor M2. Therefore, the photoelectric conversion apparatus includes a state in which the differential pair constituted by the pixel transistor Mpx and the differential transistor M3 is activated and a state in which the differential pair constituted by the transistor M2 and the differential transistor M3 is activated. When the selection transistor Msx is turned off, and the transistor M4 is turned off, the differential pair constituted by the pixel transistor Mpx and the differential transistor M3 is activated. At this time, the differential pair constituted by the transistor M2 and the differential transistor M3 is deactivated. When the selection transistor Msx is turned off, and the transistor M4 is turned on, the differential pair constituted by the transistor M2 and the differential transistor M3 is activated. At this time, the differential pair constituted by the pixel transistor Mpx and the differential transistor M3 is deactivated.

First, the state in which the differential pair constituted by the pixel transistor Mpx and the differential transistor M3 is activated will be described. When the switch sw1 is turned on in this state, the differential pair constituted by the pixel transistor Mpx and the differential transistor M3 operates as a voltage follower circuit. An input node of this voltage follower circuit is the gate of the pixel transistor Mpx. For this reason, the signal based on the voltage at the gate of the pixel transistor Mpx is output to an output node of the voltage follower circuit, that is, the drain of the differential transistor M3. At this time, when the switch sw2 is turned on, the signal based on the voltage at the gate of the pixel transistor Mpx is output to the gate of the transistor M2. On the other hand, when the switch sw1 is turned off in this state, the differential pair constituted by the pixel transistor Mpx and the differential transistor M3 operates as a comparator. This comparator compares the signal at the gate of the pixel transistor Mpx with the reference signal VRMP input to the gate of the differential transistor M3 via the clamp capacitance Cclmp. It should be noted that the reset transistor Mrx is off in either the operation the voltage follower circuit as or the operation as the comparator.

Next, the state in which the differential pair constituted by the transistor M2 and the differential transistor M3 is activated will be described. When both the switch sw1 and the switch sw2 are turned off in this state, the differential pair constituted by the transistor M2 and the differential transistor M3 operates as a comparator. This comparator compares a signal at the gate of the transistor M2 with the reference signal VRMP input to the gate of the differential transistor M3 via the clamp capacitance Cclmp.

A driving method for the photoelectric conversion apparatus according to the present example will be hereinafter described. FIG. 3 schematically illustrates a timing chart for driving signals of the photoelectric conversion apparatus. FIG. 3 illustrates driving signals during one horizontal scanning period (1H period), that is, driving signals for reading out signals in one pixel row. When the driving signal is at a high level, the transistor or the switch to which this driving signal is suppled is turned on. When the driving signal is at a low level, the transistor or the switch to which this driving signal is suppled is turned off. Specific voltages at the high level and the low level are set in accordance with a conductivity type of the transistor or the like. In addition, FIG. 3 schematically illustrates a waveform of the reference signal VRMP used for the AD conversion.

In a period P_RES from a time t0 to a time t1, resetting of the pixel 100, clamping of the noise signal to the clamp capacitance Cclmp, and output of the noise signal to the gate of the transistor M2 are performed.

At the time t0, the driving signal φR is shifted to the high level. As a result, the voltage at the gate of the pixel transistor Mpx of the pixel 100 is reset to a predetermined level.

At the same time, the driving signals φSEL and φCLMP are shifted to the high level. The selection transistor Msx and the switch sw1 are turned on, and the differential pair constituted by the pixel transistor Mpx and the differential transistor M3 operates as the voltage follower circuit. As a result, the signal based on the voltage at the gate when the voltage at the gate of the pixel transistor Mpx is reset, that is, the noise signal is output to the drain of the differential transistor M3. In addition, the voltage at the gate of the differential transistor M3 at this time is clamped to the clamp capacitance Cclmp.

At the time t0, furthermore, the driving signal φSMPL is shifted to the high level. Since the switch sw2 is turned on as a result, the noise signal is output to the gate of the transistor M2 and also sampled to the holding capacitance Csmpl.

After that, by the time t1, the driving signal φR, the driving signal φCLMP, the driving signal φSMPL, and the driving signal φSEL are sequentially shifted to the low level. Since the switch sw2 is turned off, the noise signal is held at the gate of the transistor M2. It should be noted that, as illustrated in FIG. 3, the following order is preferably adopted. That is, the driving signal φR is shifted to the low level. Then, the driving signal φCLMP and the driving signal φSMPL are shifted to the low level almost at the same time, and furthermore, after that, the driving signal φSEL is shifted to the low level. This is because, since the reset transistor Mrx is turned off before the switch sw1, thermal noise generated by the reset transistor Mrx (kT/C noise) can be reflected to the clamp level.

In a period N_AD from a time t2 to a time t3, the AD conversion with respect to the noise signal and the transfer of the charges from the photoelectric conversion element PD to the gate of the pixel transistor Mpx are performed.

At the time t2, the driving signal φEN is shifted to the high level. As a result, the differential pair constituted by the transistor M2 and the differential transistor M3 operates as the comparator. A noise signal held in a sampling capacitance Csmpl is input to the gate of the transistor M2. The comparator compares a magnitude relationship between this noise signal and the reference signal VRMP. The AD conversion with respect to the noise signal is performed by measuring time from the start of the ramping-down of the reference signal VRMP until the reversal of the magnitude relationship.

In addition, at the time t2, the driving signal φT is shifted to the high level. The transfer transistor Mtx is turned on, and the charges accumulated in the photoelectric conversion element PD are transferred to the FD node. As a result, the signal based on the charges generated in the photoelectric conversion element PD, that is, the optical signal is obtained. In the period N_AD, the driving signal φSEL is at the low level. That is, the differential pair constituted by the pixel transistor Mpx is deactivated. For this reason, the input of the optical signal to the gate of the pixel transistor Mpx does not affect the comparison operation performed by the transistor M2 and the differential transistor M3. Therefore, the AD conversion of the noise signal and the transfer of the charges in the pixel 100 can be performed at the same time.

After that, by the time t3, the driving signal φT and the driving signal φEN are sequentially shifted to the low level.

In a period S_AD from a time t4 until a time t5, the AD conversion with respect to the optical signal is performed. At the time t4, the driving signal φSEL is shifted to the high level. At this time, the driving signal φCLMP is at the low level, and the switch sw1 is off. For this reason, the differential pair constituted by the pixel transistor Mpx and the differential transistor M3 operates as the comparator. The optical signal is input to the gate of the pixel transistor Mpx. The comparator compares the magnitude relationship between this optical signal and the reference signal VRMP. The AD conversion with respect to the optical signal is performed by measuring time from the start of the ramping-down of the reference signal VRMP until the reversal of the magnitude relationship.

It should be noted that digital correlated double sampling (CDS) processing of subtracting the digital signal obtained as a result of the AD conversion with respect to the noise signal from the digital signal obtained by the AD conversion with respect to the optical signal may be performed.

As described above, according to this example, the signal of the pixel 100 based on the voltage at the gate of the pixel transistor Mpx is output to the gate of the transistor M2. According to the above-described configuration, the degree of freedom for the readout of the signal from the pixel 100 is improved. Specifically, the AD conversion with respect to the noise signal from the pixel 100 can be performed by using the differential pair constituted by the transistor M2 and the differential transistor M3. As a result, the readout of the signal from the pixel 100 can be performed in a short period of time.

EXAMPLE 2

A photoelectric conversion apparatus according to Example 2 will be described. This example is different from Example 1 in that the plurality of differential pairs constituted by the pixel transistor Mpx, the transistor M2, and the differential transistor M3 are sequentially operated to output the signal based on the voltage at the gate of the pixel transistor Mpx to the gate of the transistor M2. In addition, this example is different from Example 1 in that the control signal based on the result of the comparison by the comparison circuit 104 is output to the counter 106 via an output circuit 105. Hereinafter, differences from Example 1 will be mainly described. Descriptions of the same aspects as Example 1 will be omitted.

FIG. 4 is a block diagram schematically illustrating an overall configuration of the photoelectric conversion apparatus according to the present exemplary embodiment. Part similar to FIG. 1 is assigned with the same reference symbol as FIG. 1. The photoelectric conversion apparatus according to the present example is provided with the output circuit 105. According to this example, the control signal based on the result of the comparison by the comparison circuit 104 is output to the counter 106 via the output circuit 105. In addition, the output circuit 105 outputs a signal based on the signal of the pixel 100 to the comparison circuit 104 as a feedback signal. Since the other configuration is similar to FIG. 1, descriptions thereof will be omitted.

FIG. 5 illustrates configurations of the pixel 100 of the photoelectric conversion apparatus, the comparison circuit 104, and the output circuit 105. To simplify the explanation, FIG. 5 illustrates only one pixel 100. Part having the same function as FIG. 2 is assigned with the same reference symbol as FIG. 2.

A configuration of the pixel 100 of the photoelectric conversion apparatus according to this example is the same as Example 1. For this reason, descriptions of the pixel 100 will be omitted.

The comparison circuit 104 includes the transistor M2, the differential transistor M3, the transistor M4, the transistor M5, a load transistor M6, and the tail current source IS1. The comparison circuit 104 according to this example is different from Example 1 in that the load transistor M6 is included. The load transistor M6 is a P-channel MOS transistor. The load transistor M6 is arranged on an electric path between the transistor M2 and the power supply node. The bias voltage Vbs is supplied to a gate of the load transistor M6. Configurations and functions of the transistor M2, the differential transistor M3, the transistor M4, the transistor M5, and the tail current source IS1 are similar to those of Example 1.

The comparison circuit 104 includes the switch sw1 and the clamp capacitance Cclmp. Configurations and functions of the switch sw1 and the clamp capacitance Cclmp are similar to those of Example 1.

The comparison circuit 104 includes the switch sw2 and the holding capacitance Csmpl. A Configuration and a function of the holding capacitance Csmpl are similar to those of Example 1. In the comparison circuit 104 according to this example, the connection of the switch sw2 is different from Example 1. The switch sw2 connects the gate of and the drain of the transistor M2 to each other. When the switch sw2 is turned off, the gate of the transistor M2 becomes electrically floating. As a result, the signal can be held at the gate of the transistor M2. In other words, the switch sw2 and the holding capacitance Csmpl constitute the sample-and-hold circuit.

An operation mode of the photoelectric conversion apparatus according to the present example will be described. The operation mode of the photoelectric conversion apparatus is controlled by the selection transistor Msx, the transistor M4, the switch sw1, and the switch sw2.

The differential transistor M3 selectively constitutes the differential pair together with each of the pixel transistor Mpx and the transistor M2. Therefore, the photoelectric conversion apparatus includes a state in which the differential pair constituted by the pixel transistor Mpx and the differential transistor M3 is activated and a state in which the differential pair constituted by the transistor M2 and the differential transistor M3 is activated. When the selection transistor Msx is turned on, and the transistor M4 is turned off, the differential pair constituted by the pixel transistor Mpx and the differential transistor M3 is activated. At this time, the differential pair constituted by the transistor M2 and the differential transistor M3 is deactivated. When the selection transistor Msx is turned off, and the transistor M4 is turned on, the differential pair constituted by the transistor M2 and the differential transistor M3 is activated. At this time, the differential pair constituted by the pixel transistor Mpx and the differential transistor M3 is deactivated.

First, the state in which the differential pair constituted by the pixel transistor Mpx and the differential transistor M3 is activated will be described. When the switch sw1 is turned on in this state, the differential pair constituted by the pixel transistor Mpx and the differential transistor M3 operates as the first voltage follower circuit. The input node of the first voltage follower circuit is the gate of the pixel transistor Mpx. For this reason, the signal based on the voltage at the gate of the pixel transistor Mpx is output to the output node of the first voltage follower circuit, that is, the gate and the drain of the differential transistor M3. On the other hand, when the switch sw1 is turned off in this state, the differential pair constituted by the pixel transistor Mpx and the differential transistor M3 operates as a comparator. This comparator compares the signal at the gate of the pixel transistor Mpx with the reference signal VRMP input to the gate of the differential transistor M3 via the clamp capacitance Cclmp. It should be noted that the reset transistor Mrx is off in both the operation as the first voltage follower circuit and the operation as the comparator.

Next, the state in which the differential pair constituted by the transistor M2 and the differential transistor M3 is activated will be described. When one of the switch sw1 and the switch sw2 is turned off and the other one is turned on in this state, the differential pair constituted by the transistor M2 and the differential transistor M3 operates as the second voltage follower circuit. In a case where the switch sw1 is turned on, the input node of the second voltage follower circuit is the gate of the transistor M2. In a case where the switch sw2 is turned on, the input node of the second voltage follower circuit is the gate of the differential transistor M3. When both the switch sw1 and the switch sw2 are turned off in this state, the differential pair constituted by the transistor M2 and the differential transistor M3 operates as a comparator. This comparator compares the signal at the gate of the transistor M2 with the reference signal VRMP input to the gate of the differential transistor M3 via the clamp capacitance Cclmp.

The comparison circuit 104 according to this example includes a switch sw4. The switch sw4 connects the tail current source IS1 to a common wiring line 501. Although not illustrated in FIG. 5, the plurality of pixels 100 are connected to the common wiring line 501. The switch sw4 is controlled by a driving signal φVLON. When the differential pair constituted by the transistor M2 and the differential transistor M3 is activated, the switch sw4 is turned off. That is, the switch sw4 functions as a breaker that cuts off the connection between the differential pair constituted by the transistor M2 and the differential transistor M3 and the common wiring line 501. As a result, it is possible to decrease a capacitance of the node connected to the tail current source IS1. As a result, a circuit including the differential pair constituted by the transistor M2 and the differential transistor M3 can operate at a high speed.

In this example, the output circuit 105 is connected to the drain of the differential transistor M3. An inverter INV is connected to an output node 502 of the output circuit 105. The output node 502 of the output circuit 105 is a different node from the source and the drain of the pixel transistor Mpx and the source and the drain of the differential transistor M3.

The output circuit 105 performs a first operation of outputting a voltage based on the voltage at the gate of the pixel transistor Mpx to the gate of the differential transistor M3. In addition the output circuit 105 receives a current from the differential transistor M3 and performs a second operation of outputting a signal based on a result of the comparison between the voltage at the gate of the pixel transistor Mpx and the voltage at the gate of the differential transistor M3 to the output node 502. For example, when the differential pair constituted by the pixel transistor Mpx and the differential transistor M3 operates as the voltage follower circuit, the output circuit 105 performs the first operation. When the differential pair constituted by the pixel transistor Mpx and the differential transistor M3 operates as the comparator, the output circuit 105 performs the second operation.

In the first operation, the output circuit 105 may operate as a current source that supplies a current to the differential transistor M3. At this time, the output circuit 105 becomes a load of the differential pair constituted by the pixel transistor Mpx and the differential transistor M3. Therefore, when the gate and the drain of the differential transistor M3 is short-circuited by the switch sw1, the output circuit 105 outputs the voltage based on the voltage at the gate of the pixel transistor Mpx to the gate of the differential transistor M3.

In the second operation, the output circuit 105 may operate as a current detection circuit that detects a current of the differential transistor M3. The current detection circuit outputs a change in the current of the differential transistor M3 as another signal to the output node 502. With this function, the output circuit 105 outputs a signal based on the result of the comparison between the signal at the gate of the pixel transistor Mpx and the signal at the gate of the differential transistor M3 to the output node 502.

For example, in a case where the voltage at the gate of the differential transistor M3 is higher than the voltage at the gate of the pixel transistor Mpx, the output circuit 105 outputs a first voltage to the output node 502. On the other hand, in a case where the voltage at the gate of the differential transistor M3 is lower than the voltage at the gate of the pixel transistor Mpx, the output circuit 105 outputs a second voltage different from the first voltage to the output node 502.

In the above-described explanation, a parasitic resistance of a wiring line to which the tail current source IS1 is connected is ignored. The parasitic resistance of the wiring line may be an offset of a circuit formed by the differential pair constituted by the pixel transistor Mpx and the differential transistor M3.

The output circuit 105 includes a control unit configured to set a change amount in a voltage at the drain of the differential transistor M3 in the above-described second operation to be lower than a change amount in a voltage at the output node 502. In particular, the control unit sets the change amount in the voltage at the drain of the differential transistor M3 when a relationship between a magnitude of the voltage at the gate of the pixel transistor Mpx and a magnitude of the voltage at the gate of the differential transistor M3 is reversed, to be lower than the change amount in the voltage at the output node 502. The change amount in the voltage at the output node 502 at this time is a difference between the first voltage and the second voltage described above.

The control unit includes a current mirror circuit. The current mirror circuit includes a transistor M7 and a transistor M8. The transistor M7 and the transistor M8 are both a P-channel MOS transistor. A drain of the transistor M7 is electrically connected to the drain of the differential transistor M3. A gate of the transistor M7 and a gate of the transistor M8 are connected to each other and also connected to the drain of the transistor M7.

When the output circuit 105 performs the first operation, the current mirror circuit constituted by the transistor M7 and the transistor M8 mirrors a current of the transistor M8 to the transistor M7. On the other hand, when the output circuit 105 performs the second operation, the current mirror circuit mirrors a current of the transistor M7 to the transistor M8. In other words, in the first operation, the current mirror circuit operates as a current source load for supplying a current from the transistor M7 to the differential transistor M3. In the second operation, the current mirror circuit operates as a current detection circuit that mirrors a current input from the differential transistor M3 to the transistor M7 to the transistor M8.

The output circuit 105 also includes a connection switch sw3 that connects the gate and the drain of the transistor M8 to each other. The connection switch sw3 is controlled by a driving signal φMOD. The connection switch sw3 switches the first operation and the second operation described above. Specifically, when the connection switch sw3 is turned on, the current mirror circuit can mirror the current of the transistor M8 to the transistor M7. When the connection switch sw3 is turned off, the current mirror circuit can mirror the current of the transistor M7 to the transistor M8.

Furthermore, the output circuit 105 includes a capacitance C1. The capacitance C1 includes a first terminal electrically connected to the drain of the transistor M7 and a second terminal electrically connected to the gate of the transistor M7. With the capacitance C1, the drain and the gate of the transistor M7 establish an alternating-current (AC) coupling, and the current of the transistor M7 can be mirrored to the transistor M8. The output circuit 105 also includes a reference current source IS2 connected to the output node 502. The reference current source IS2 outputs a reference current to the transistor M8.

Next, an effect realized by the output circuit 105 according to this example will be described. In the photoelectric conversion apparatus described in FIG. 2 of PTL 1, a drain of a differential transistor is an output node. For this reason, in the comparison operation, when a relationship between a voltage at a gate of an amplification transistor of a pixel and a voltage at a gate of the differential transistor is reversed, a voltage at the drain of the differential transistor is largely changed. Specifically, a change amount in the voltage at the drain of the differential transistor is substantially equal to a difference between a ground voltage and a power supply voltage (AVD of FIG. 2). A change in the voltage at the drain of the differential transistor may be transmitted via a parasitic capacitance between the gate and the drain of the differential transistor to the gate of the differential transistor, that is, the node for supplying the reference signal.

A variation in the voltage at the node for supplying the reference signal may decrease the accuracy of the signal output from the photoelectric conversion apparatus. For example, since the reference signal is changed in a reverse direction after an output of a differential amplifier is reversed, the output of this differential amplifier may be reversed. In addition, in a case where a common reference signal is supplied to a plurality of differential amplifiers, a change in the reference signal caused by a reversal of an output of one differential amplifier may reverse an output of another differential amplifier. As a result, the accuracy of the analog-to-digital conversion may be decreased. That is, the accuracy of the digital signal output from the photoelectric conversion apparatus may be decreased.

In contrast to the above, according to this example, the output circuit 105 includes a control unit configured to reduce a variation in the voltage at the drain of the differential transistor M3. According to the above-described configuration, it is possible to reduce a variation in the reference signal caused by the variation in the voltage at the drain of the differential transistor M3. As a result, it is possible to improve the accuracy of the signal output from the photoelectric conversion apparatus.

Next, a driving method for the photoelectric conversion apparatus according to the present example will be described. FIG. 6 schematically illustrates a timing chart for driving signals of the photoelectric conversion apparatus. FIG. 6 illustrates driving signals during one horizontal scanning period (1H period), that is, driving signals for reading out signals in one pixel row. When the driving signal is at a high level, the transistor or the switch to which this driving signal is suppled is turned on. When the driving signal is at a low level, the transistor or the switch to which this driving signal is suppled is turned off. Specific voltages at the high level and the low level are set in accordance with a conductivity type of the transistor or the like. In addition, FIG. 6 schematically illustrates a waveform of the reference signal VRMP used for the AD conversion.

In the period P_RES from the time t0 to the time t1, the resetting of the pixel 100 and the clamping of the noise signal to the clamp capacitance Cclmp are performed.

At the time t0, the driving signal φR is shifted to the high level. As a result, the voltage at the gate of the pixel transistor Mpx of the pixel 100 is reset to a predetermined level.

At the same time, the driving signal φSEL, the driving signal φCLMP, the driving signal φVLON, and the driving signal φMOD are shifted to the high level. Since the connection switch sw3 is turned on, the transistor M8 and the reference current source IS2 supply a bias voltage to the gate of the transistor M7. That is, the current of the transistor M8 is mirrored to the transistor M7. For this reason, the output circuit 105 performs the first operation, and the transistor M7 of the output circuit 105 operates as a load. In addition, the selection transistor Msx and the switch sw1 are turned on, and the differential pair constituted by the pixel transistor Mpx and the differential transistor M3 operates as the first voltage follower circuit. As a result, the signal based on the voltage at the gate when the voltage at the gate of the pixel transistor Mpx is reset, that is, the noise signal is output to the gate and the drain of the differential transistor M3. In addition, the voltage at the gate of the differential transistor M3 at this time is clamped to the clamp capacitance Cclmp. According to this example, an operating point of the transistor M7 at this time is clamped to the capacitance C1.

After that, by the time t1, the driving signal φR, the driving signal φCLMP, the driving signal φMOD, the driving signal φVLON, and the driving signal φSEL are sequentially shifted to the low level. Since these driving signals are shifted to the low level in the stated order, thermal noise generated by the reset transistor Mrx (kT/C noise) can be reflected to the clamp level.

In a period N_SH from the time t1 to the time t2, the output of the noise signal to the gate of the transistor M2 is performed.

At the time t1, the driving signal φSMPL and the driving signal φEN are shifted to the high level. As a result, the differential pair constituted by the transistor M2 and the differential transistor M3 operates as the second voltage follower circuit. Since the switch sw2 is turned on, the noise signal at the gate of the differential transistor M3 is output to the gate and the drain of the transistor M2. The noise signal output to the gate of the transistor M2 is sampled to the holding capacitance Csmpl. Thereafter, at the time t2, the driving signal φSMPL is shifted to the low level. Accordingly, the switch sw2 is turned off, and the noise signal is held at the gate of the transistor M2.

In the period N_AD from the time t2 to the time t3, the AD conversion with respect to the noise signal and the transfer of the charges from the photoelectric conversion element PD to the gate of the pixel transistor Mpx are performed.

In the period N_AD, the driving signal φEN is at the high level. On the other hand, the driving signal φSMPL and the driving signal φCLMP are at the low level. For this reason, the differential pair constituted by the transistor M2 and the differential transistor M3 operates as the comparator. The noise signal held in the sampling capacitance Csmpl is input to the gate of the transistor M2. The comparator compares a magnitude relationship between this noise signal and the reference signal VRMP. The AD conversion with respect to the noise signal is performed by measuring time from the start of the ramping-down of the reference signal VRMP until the reversal of the magnitude relationship.

At this time, since the connection switch sw3 is off, the output circuit 105 performs the second operation. Specifically, the current of the transistor M7 is mirrored to the transistor M8. A voltage at the output node 502 of the output circuit 105 is determined on the basis of the current mirrored to the transistor M8 and the current of the reference current source IS2.

In addition, at the time t2, the driving signal φT is shifted to the high level. The transfer transistor Mtx is turned on, and the charges accumulated in the photoelectric conversion element PD are transferred to the FD node. As a result, the signal based on the charges generated in the photoelectric conversion element PD, that is, the optical signal is obtained. In the period N_AD, the driving signal φSEL is at the low level. That is, the differential pair constituted by the pixel transistor Mpx is deactivated. For this reason, the input of the optical signal to the gate of the pixel transistor Mpx does not affect the comparison operation performed by the transistor M2 and the differential transistor M3. Therefore, the AD conversion of the noise signal and the transfer of the charges in the pixel 100 can be performed at the same time.

Thereafter, at the time t3, the driving signal φT and the driving signal φEN are shifted to the low level.

In the period N_SH and the period N_AD, the driving signal φVLON is at the low level. Therefore, the common wiring line 501 connected to the plurality of pixels 100 is cut off from the differential pair constituted by the transistor M2 and the differential transistor M3. According to the above-described configuration, the output of the noise signal to the gate of the transistor M2 can be performed at a high speed. As an alternative to the above, the AD conversion with respect to the noise signal can be accurately performed.

In the period S_AD from the time t4 to the time t5, the AD conversion with respect to the optical signal is performed. At the time t4, the driving signal φSEL and the driving signal φVLON are shifted to the high level. At this time, the driving signal φCLMP is at the low level, and the switch sw1 is off. For this reason, the differential pair constituted by the pixel transistor Mpx and the differential transistor M3 operates as the comparator. The optical signal is input to the gate of the pixel transistor Mpx. The comparator compares the magnitude relationship between this optical signal and the reference signal VRMP. The AD conversion with respect to the optical signal is performed by measuring time from the start of the ramping-down of the reference signal VRMP until the reversal of the magnitude relationship. At this time, the output circuit 105 performs the second operation.

It should be noted that the digital correlated double sampling (CDS) processing of subtracting the digital signal obtained as a result of the AD conversion with respect to the noise signal from the digital signal obtained by the AD conversion with respect to the optical signal may be performed.

As described above, according to this example, the signal based on the voltage at the gate of the pixel transistor Mpx of the pixel 100 is output to the gate of the transistor M2. According to the above-described configuration, the degree of freedom for the readout of the signal from the pixel 100 is improved. Specifically, the AD conversion with respect to the noise signal from the pixel 100 can be performed by using the differential pair constituted by the transistor M2 and the differential transistor M3. As a result, the readout of the signal from the pixel 100 can be performed in a short period of time.

In addition, the photoelectric conversion apparatus according to the present example includes the output circuit 105. According to the above-described configuration, the accuracy of the signal output from the photoelectric conversion apparatus can be improved.

It should be noted that the switch sw4 may be omitted. According to an example in which the switch sw4 is omitted, the common wiring line 501 is directly connected to the tail current source IS1. In addition, the photoelectric conversion apparatus according to Example 1 may include the switch sw4.

The output circuit 105 may be omitted. According to an example in which the output circuit 105 is omitted, the output circuit 105 of FIG. 5 is replaced with the load transistor M1 of FIG. 2. The photoelectric conversion apparatus according to Example 1 may include the output circuit 105 instead of the load transistor M1.

EXAMPLE 3

A photoelectric conversion apparatus according to Example 3 will be described. According to this example, the pixel transistor Mpx, the selection transistor Msx, and the reset transistor Mrx included in the pixel 100 respectively have similar functions to those of the transistor M2, the transistor M4, and the switch sw2 according to Example 2. Hereinafter, differences from Example 1 and Example 2 will be described, and descriptions of similar part to that of Example 1 or Example 2 will be omitted.

The overall configuration of the photoelectric conversion apparatus according to the present example is the same as Example 1 or Example 2. That is, FIG. 1 or FIG. 4 is a block diagram schematically illustrating an overall configuration of the photoelectric conversion apparatus according to the present example.

FIG. 7 illustrates configurations of the pixel 100 of the photoelectric conversion apparatus, the comparison circuit 104, and the output circuit 105. To simplify the explanation, FIG. 7 illustrates only two pixels 100. A component having a similar function to that of FIG. 2 or FIG. 5 is assigned with the same reference symbol as that of FIG. 2 or FIG. 5.

A configuration of the pixel 100 of the photoelectric conversion apparatus according to this example is the same as Example 1. For this reason, descriptions of the pixel 100 will be omitted. It should be noted however that, to distinguish the plurality of pixels 100 from one another, reference symbols representing elements included in the first pixel 100 or driving signals supplied to those elements include a numeral 1 at the end. Similarly, reference symbols representing elements included in the second pixel 100 or driving signals supplied to those elements include a numeral 2 at the end.

The comparison circuit 104 includes the differential transistor M3, the transistor M5, the load transistor M6, and the tail current source IS1. The load transistor M6 is a P-channel MOS transistor. The load transistor M6 is arranged on an electric path between a wiring line 701 and the power supply node. The bias voltage Vbs is supplied to the gate of the load transistor M6. Configurations and functions of the differential transistor M3, the transistor M5, and the tail current source IS1 are similar to those according to Example 1 or Example 2.

The comparison circuit 104 includes the switch sw1 and the clamp capacitance Cclmp. Configurations and functions of the switch sw1 and the clamp capacitance Cclmp are similar to those according to Example 1 or Example 2.

The comparison circuit 104 according to this example includes a switch sw5. The switch sw5 connects the wiring line 701 to the power supply node. From another point of view, the switch sw5 connects a source and a drain of the load transistor M6 to each other. For this reason, the load transistor M6 and the switch sw5 may form a parallel electric path between the wiring line 701 and the power supply node. The switch sw5 is controlled by a driving signal φLD. When the switch sw5 is turned on, the power supply node and the wiring line 701 are short-circuited. Therefore, the power supply voltage VDD is supplied to the drain of the reset transistor Mrx of the pixel 100 and the drain of the pixel transistor Mpx. When the switch sw5 is turned on, the source and the drain of the load transistor are short-circuited. When the switch sw5 is turned off, the load transistor M6 is inserted to the electric path between the power supply node and the wiring line 701. As a result, the load transistor M6 operates as a load of the differential pair constituted by the pixel transistor Mpx of the pixel 100.

An operation mode of the photoelectric conversion apparatus according to the present example will be described. The operation mode of the photoelectric conversion apparatus is controlled by the selection transistor Msx, the reset transistor Mrx, and the switch sw1. It should be noted that the switch sw5 is appropriately controlled to be on and off in accordance with an operation mode.

The differential transistor M3 selectively constitutes the differential pair together with each of the pixel transistor Mpx1 of the first pixel 100 and the pixel transistor Mpx2 of the second pixel 100. Therefore, the photoelectric conversion apparatus includes a state in which the differential pair constituted by the pixel transistor Mpx1 and the differential transistor M3 is activated and a state in which the differential pair constituted by the pixel transistor Mpx2 and the differential transistor M3 is activated. When the selection transistor Msx1 is turned on, and the selection transistor Msx2 is turned off, the differential pair constituted by the pixel transistor Mpx1 and the differential transistor M3 is activated. At this time, the differential pair constituted by the pixel transistor Mpx2 and the differential transistor M3 is deactivated. When the selection transistor Msx1 is turned off, the selection transistor Msx2 is turned on, the differential pair constituted by the pixel transistor Mpx2 and the differential transistor M3 is activated. At this time, the differential pair constituted by the pixel transistor Mpx1 and the differential transistor M3 is deactivated.

First, the state in which the differential pair constituted by the pixel transistor Mpx1 and the differential transistor M3 is activated will be described. When the switch sw1 is turned on in this state, the differential pair constituted by the pixel transistor Mpx1 and the differential transistor M3 operates as the first voltage follower circuit. The input node of the first voltage follower circuit is a gate of the pixel transistor Mpx1. For this reason, a signal based on a voltage at the gate of the pixel transistor Mpx1 is output to the output node of the first voltage follower circuit, that is, the gate and the drain of the differential transistor M3. At this time, the switch sw5 is preferably in an on state. On the other hand, when the switch sw1 is turned off in this state, the differential pair constituted by the pixel transistor Mpx1 and the differential transistor M3 operates as a comparator. This comparator compares a signal at the gate of the pixel transistor Mpx1 with the reference signal VRMP input to the gate of the differential transistor M3 via the clamp capacitance Cclmp. At this time, the switch sw5 is preferably in an on state. It should be noted that, in both the operation as the first voltage follower circuit and the operation as the comparator, the reset transistor Mrx1 is off.

Next, the state in which the differential pair constituted by the pixel transistor Mpx2 and the differential transistor M3 is activated is described. In this state, when one of the reset transistor Mrx2 and the switch sw1 is turned off, and also the other one is turned on, the differential pair constituted by the pixel transistor Mpx2 and the differential transistor M3 operates as the second voltage follower circuit. In a case where the switch sw1 is turned on, the input node of the second voltage follower circuit is a gate of the pixel transistor Mpx2. At this time, the switch sw5 is preferably in an on state. In a case where the reset transistor Mrx2 is turned on, the input node of the second voltage follower circuit is the gate of the differential transistor M3. At this time, the switch sw5 is preferably in an off state. In addition, when both the reset transistor Mrx2 and the switch sw1 are turned off in this state, the differential pair constituted by the pixel transistor Mpx2 and the differential transistor M3 operates as a comparator. This comparator compares a signal at the gate of the pixel transistor Mpx2 with the reference signal VRMP input to the gate of the differential transistor M3 via the clamp capacitance Cclmp. At this time, the switch sw5 is preferably in an on state.

A configuration of the output circuit 105 is the same as Example 2. According to this example, when the differential pair constituted by the pixel transistor Mpx1 and the differential transistor M3 operates as the voltage follower circuit, for example, the output circuit 105 performs the first operation. When the differential pair constituted by the pixel transistor Mpx2 and the differential transistor M3 operates as the voltage follower circuit, the output circuit 105 performs the first operation. When the differential pair constituted by the pixel transistor Mpx1 and the differential transistor M3 operates as the comparator, the output circuit 105 performs the second operation. When the differential pair constituted by the pixel transistor Mpx2 and the differential transistor M3 operates as the comparator, the output circuit 105 performs the second operation.

Next, a driving method for the photoelectric conversion apparatus according to the present example will be described. FIG. 8 schematically illustrates a timing chart for driving signals of the photoelectric conversion apparatus. FIG. 9 illustrates driving signals during one horizontal scanning period (1H period), that is, driving signals for reading out signals in one pixel row. When the driving signal is at a high level, the transistor or the switch to which this driving signal is suppled is turned on. When the driving signal is at a low level, the transistor or the switch to which this driving signal is suppled is turned off. Specific voltages at the high level and the low level are set in accordance with a conductivity type of the transistor or the like. FIG. 8 also schematically illustrates a waveform of the reference signal VRMP used for the AD conversion.

In the period P_RES from the time t0 to the time t1, the resetting of the pixel 100 and the clamping of the noise signal to the clamp capacitance Cclmp are performed.

At the time t0, the driving signal φR1 and the driving signal φLD are shifted to the high level. As a result, a voltage at the gate of the pixel transistor Mpx1 of the first pixel 100 is reset to be at a predetermined level. Since the switch sw5 is on, the power supply voltage VDD is supplied to a drain of the reset transistor Mrx1. For this reason, the gate of the pixel transistor Mpx1 of the first pixel 100 is reset to be at a level in accordance with the power supply voltage VDD.

At the same time, the driving signal φSEL1, the driving signal φCLMP, and the driving signal φMOD are shifted to the high level. Since the connection switch sw3 is turned on, the transistor M8 and the reference current source IS2 supply the bias voltage to the gate of the transistor M7. That is, the current of the transistor M8 is mirrored to the transistor M7. For this reason, the output circuit 105 performs the first operation, and the transistor M7 of the output circuit 105 operates as a load. In addition, the selection transistor Msx1 and the switch sw1 are turned on, and the differential pair constituted by the pixel transistor Mpx1 and the differential transistor M3 operates as the first voltage follower circuit. As a result, a signal based on the voltage at the gate when the voltage at the gate of the pixel transistor Mpx1 is reset, that is, the noise signal is output to the gate and the drain of the differential transistor M3. In addition, the voltage at the gate of the differential transistor M3 at this time is clamped to the clamp capacitance Cclmp. According to this example, an operating point of the transistor M7 at this time is clamped to the capacitance C1.

After that, by the time t1, the driving signal φR1, the driving signal φCLMP, the driving signal (φMOD, the driving signal φLD, and the driving signal φSEL1 are sequentially shifted to the low level. Since these driving signals are shifted to the low level in the stated order, thermal noise generated by the reset transistor Mrx (kT/C noise) can be reflected to the clamp level.

In the period N_SH from the time t1 to the time t2, the output of the noise signal to the gate of the pixel transistor Mpx2 of the second pixel 100 is performed. This noise signal is the noise signal output from the first pixel 100.

At the time t1, the driving signal φLD is shifted to the low level. Since the switch sw5 is turned off, the load transistor M6 operates as a load that supplies a current to a drain of the pixel transistor Mpx2 of the second pixel 100. At the time t1, furthermore, the driving signal φR2 and the driving signal φSEL2 are shifted to the high level. As a result, the differential pair constituted by the pixel transistor Mpx2 and the differential transistor M3 operates as the second voltage follower circuit. Since the reset transistor Mrx2 is on, the noise signal at the gate of the differential transistor M3 is output to the gate and the drain of the pixel transistor Mpx2. The noise signal output to the gate of the pixel transistor Mpx2 is sampled to a parasitic capacitance Cfd of the FD node. Thereafter, at the time t2, the driving signal φR2 is shifted to the low level. Accordingly, the reset transistor Mrx2 is turned off, and the noise signal from the first pixel 100 is held at the gate of the pixel transistor Mpx2 of the second pixel 100.

It should be noted that, at the time t2, the driving signal φLD is shifted to the high level. Accordingly, the power supply voltage VDD is supplied to the wiring line 701. In the subsequent operations, the driving signal φLD is maintained to be at the high level.

In the period N_AD from the time t2 to the time t3, the AD conversion with respect to the noise signal from the first pixel 100 and the transfer of the charges from the photoelectric conversion element PD1 in the first pixel 100 to the gate of the pixel transistor Mpx1 are performed. The differential pair constituted by the pixel transistor Mpx2 of the second pixel 100 and the differential transistor M3 is used for the AD conversion with respect to the noise signal from the first pixel 100.

In the period N_AD, the driving signal φSEL2 is at the high level. On the other hand, the driving signal φR2 and the driving signal φCLMP are at the low level. For this reason, the differential pair constituted by the pixel transistor Mpx2 of the second pixel 100 and the differential transistor M3 operates as the comparator. The noise signal from the first pixel 100 is input to the gate of the pixel transistor Mpx2 of the second pixel. Therefore, the comparator compares a magnitude relationship between the noise signal from the first pixel 100 and the reference signal VRMP. The AD conversion with respect to the noise signal is performed by measuring time from the start of the ramping-down of the reference signal VRMP until the reversal of the magnitude relationship.

Since the connection switch sw3 is off at this time, the output circuit 105 performs the second operation. Specifically, the current of the transistor M7 is mirrored to the transistor M8. The voltage at the output node 502 of the output circuit 105 is determined on the basis of a relationship between the current mirrored to the transistor M8 and the current of the reference current source IS2.

In addition, at the time t2, the driving signal φT1 is shifted to the high level. The transfer transistor Mtx of the first pixel 100 is turned on, and the charges accumulated in the photoelectric conversion element PD1 of the first pixel 100 are transferred to the FD node. As a result, a signal based on the charges generated in the photoelectric conversion element PD1, that is, an optical signal is obtained. In the period N_AD, the driving signal φSEL1 is at the low level. That is, the differential pair constituted by the pixel transistor Mpx1 of the first pixel 100 is deactivated. For this reason, the input of the optical signal to the gate of the pixel transistor Mpx1 of the first pixel 100 does not affect the comparison operation performed by the pixel transistor Mpx2 of the second pixel 100 and the differential transistor M3. Therefore, the AD conversion with respect to the noise signal and the transfer of the charges in the first pixel 100 can be performed at the same time.

Thereafter, at the time t3, the driving signal φT1 and the driving signal φSEL2 are shifted to the low level.

In the period S_AD from the time t4 to the time t5, the AD conversion with respect to the optical signal of the first pixel 100 is performed. The differential pair constituted by the pixel transistor Mpx1 of the first pixel 100 and the differential transistor M3 is used for the AD conversion with respect to the optical signal of the first pixel 100.

At the time t4, the driving signal φSEL1 is shifted to the high level. At this time, the driving signal φCLMP is at the low level, and the switch sw1 is off. For this reason, the differential pair constituted by the pixel transistor Mpx1 of the first pixel 100 and the differential transistor M3 operates as the comparator. The optical signal is input to the gate of the pixel transistor Mpx1. The comparator compares the magnitude relationship between this optical signal and the reference signal VRMP. The AD conversion with respect to the optical signal is performed by measuring time from the start of the ramping-down of the reference signal VRMP until the reversal of the magnitude relationship. At this time, the output circuit 105 performs the second operation.

It should be noted that the digital correlated double sampling (CDS) processing of subtracting the digital signal obtained as a result of the AD conversion with respect to the noise signal from the digital signal obtained by the AD conversion with respect to the optical signal may be performed.

As described above, according to this example, the signal based on the voltage at the gate of the pixel transistor Mpx1 of the first pixel 100 is output to the gate of the pixel transistor Mpx2 of the second pixel 100. According to the above-described configuration, the degree of freedom for the readout of the signal from the pixel 100 is improved. Specifically, the AD conversion with respect to the noise signal from the first pixel 100 can be performed by using the differential pair constituted by the pixel transistor Mpx2 of the second pixel 100 and the differential transistor M3. As a result, the readout of the signal from the first pixel 100 can be performed in a short period of time.

In this example, the pixel transistor Mpx, the selection transistor Msx, and the reset transistor Mrx included in the pixel 100 respectively have similar functions to those of the transistor M2, the transistor M4, and the switch sw2 according to Example 2. For this reason, the number of transistors of the photoelectric conversion apparatus can be reduced.

In addition, the photoelectric conversion apparatus according to the present example includes the output circuit 105. According to the above-described configuration, the accuracy of the signal output from the photoelectric conversion apparatus can be improved. The output circuit 105 may be omitted. In an example in which the output circuit 105 is omitted, the output circuit 105 of FIG. 7 is replaced with the load transistor M1 of FIG. 2.

EXAMPLE 4

FIG. 9 illustrates a configuration of a photoelectric conversion system according to an exemplary embodiment of the present invention. A photoelectric conversion system 800 includes, for example, an optical unit 810, an image pickup element 1, a video signal processing unit 830, a recording and communication unit 840, a timing control unit 850, a system control unit 860, and a reproduction and display unit 870. An image pickup apparatus 820 includes the image pickup element 1 and the video signal processing unit 830. The photoelectric conversion apparatus according to any one of Example 1 to Example 3 described above is used as the image pickup element 1.

The optical unit 810 corresponding to an optical system such as a lens images light from a subject on the pixel array 102, in which a plurality of pixels are two-dimensionally arranged, of the image pickup element 1 to form an image of the subject. The image pickup element 1 outputs a signal in accordance with the light imaged on the pixel array 102 at a timing based on a signal from the timing control unit 850. The signal output from the image pickup element 1 is input to the video signal processing unit 830 configured to process a video signal, and the video signal processing unit 830 performs signal processing in accordance with a method determined by a program or the like. The signal obtained by the processing in the video signal processing unit 830 is transmitted to the recording and communication unit 840 as image data. The recording and communication unit 840 transmits a signal for forming an image to the reproduction and display unit 870, and video or a still image is reproduced and displayed on the reproduction and display unit 870. In addition, the recording and communication unit 840 receives the signal from the video signal processing unit 830 to communicate with the system control unit 860 and also performs an operation of recording the signal for forming the image in a recording medium that is not illustrated in the drawing.

The system control unit 860 is configured to perform an overall control of an operation of an image pickup system and controls driving of the optical unit 810, the timing control unit 850, the recording and communication unit 840, and the reproduction and display unit 870. The system control unit 860 is provided with a storage device that is not illustrated in the drawing corresponding to a recording medium, for example. A program or the like used for controlling the operation of the storage device is recorded in the storage device. The system control unit 860 also supplies a signal for switching a driving mode in accordance with an operation of a user, for example, to the inside of the image pickup system. Specific examples include changing of a row to be read out or a row to be reset, changing of a field angle accompanied by electronic zooming, shifting of the field angle accompanied by electronic vibration control, and the like. The timing control unit 850 controls driving timings of the image pickup element 1 and the video signal processing unit 830 on the basis of the control by the system control unit 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166055, filed Aug. 25, 2015, which is hereby incorporated by reference herein in its entirety.

The invention claimed is:

1. A photoelectric conversion apparatus comprising:
   a photoelectric conversion element;
   a first transistor including a gate that receives a first signal from the photoelectric conversion element;
   a second transistor; and
   a third transistor that selectively constitutes a first differential pair constituted by the first transistor and the third transistor, and a second differential pair constituted by the second transistor and the third transistor,
   wherein a second signal based on a voltage at the gate of the first transistor is output to a gate of the second transistor.

2. The photoelectric conversion apparatus according to claim 1,
   wherein a reference signal used for an analog-to-digital conversion is input to a gate of the third transistor,
   wherein a comparator including the first differential pair constituted by the first transistor and the third transistor performs a comparison between the first signal and the reference signal, and
   wherein a comparator including the second differential pair constituted by the second transistor and the third transistor performs a comparison between the second signal and the reference signal.

3. The photoelectric conversion apparatus according to claim 2, further comprising:
   a reset transistor configured to reset the voltage at the gate of the first transistor,
   wherein the second signal is a signal based on the voltage at the gate of the first transistor when the reset transistor resets the voltage at the gate of the first transistor.

4. The photoelectric conversion apparatus according to claim 2, further comprising:
   a transfer transistor configured to transfer charges generated in the photoelectric conversion element to the gate of the first transistor,
   wherein the first signal is a signal obtained when the transfer transistor transfers the charges generated in the photoelectric conversion element to the gate of the first transistor.

5. The photoelectric conversion apparatus according to claim 4,
   wherein the transfer transistor transfers the charges generated in the photoelectric conversion element to the gate of the first transistor while the comparison between the second signal and the reference signal is performed.

6. The photoelectric conversion apparatus according to claim 1, further comprising:
   a first switch that connects the gate and a drain of the third transistor; and
   a second switch that connects the gate of the second transistor to the drain of the third transistor,
   wherein, when the first switch and the second switch are on, a voltage follower circuit including the first differential pair outputs the second signal to the gate of the second transistor via the second switch.

7. The photoelectric conversion apparatus according to claim 6, further comprising:
   a clamp capacitance connected to the gate of the third transistor,
   wherein the voltage follower circuit clamps a voltage based on the voltage at the gate of the first transistor to the clamp capacitance.

8. The photoelectric conversion apparatus according to claim 1, further comprising:
   a first switch that connects the gate and a drain of the third transistor; and
   a second switch that connects the gate and a drain of the second transistor,
   wherein, when the first switch is on, a first voltage follower circuit including the first differential pair outputs a third signal based on the voltage at the gate of the first transistor to the gate of the third transistor, and
   wherein, when the first switch is off and also the second switch is on, a second voltage follower circuit including the second differential pair outputs the second signal to the gate of the second transistor on the basis of the third signal held at the gate of the third transistor.

9. The photoelectric conversion apparatus according to claim 8, further comprising:
   a clamp capacitance connected to the gate of the third transistor,
   wherein the first voltage follower circuit clamps the voltage based on the voltage at the gate of the first transistor to the clamp capacitance.

10. The photoelectric conversion apparatus according to claim 1, further comprising:
    a sample-and-hold circuit that sets the gate of the second transistor to be electrically floating to hold the second signal at the gate of the second transistor.

11. The photoelectric conversion apparatus according to claim 1, further comprising:
    a control unit configured to switch a state in which the first differential pair is activated and also the second differential pair is deactivated and a state in which the first differential pair is deactivated and also the second differential pair is activated.

12. The photoelectric conversion apparatus according to claim 11, further comprising:
    a current source that supplies a current to the first differential pair and the second differential pair,
    wherein the control unit includes a plurality of transistors arranged respectively between corresponding one of the first transistor and the second transistor and the current source.

13. The photoelectric conversion apparatus according to claim 1, further comprising:
    a plurality of pixels each including the photoelectric conversion element and the first transistor;
    a common wiring line to which the plurality of pixels are connected; and
    a breaker that cuts off a connection between the second differential pair and the common wiring line when the second differential pair is activated.

14. The photoelectric conversion apparatus according to claim 1, further comprising:
    a load transistor connected to a drain of the first transistor and the drain of the second transistor; and
    a switch that connects a source and a drain of the load transistor to each other.

15. The photoelectric conversion apparatus according to claim 1, further comprising:
    a second photoelectric conversion element,
    wherein the gate of the second transistor receives a signal based on charges generated in the second photoelectric conversion element.

16. The photoelectric conversion apparatus according to claim 1,
wherein the charges generated by the photoelectric conversion are not transferred to the gate of the second transistor.

17. The photoelectric conversion apparatus according to claim 1, further comprising:
an output circuit that performs a first operation of outputting the voltage based on the voltage at the gate of the first transistor to the gate of the third transistor and a second operation of outputting, when a current from the third transistor is received, a signal based on a result of a comparison between the voltage at the gate of the first transistor and the voltage at the gate of the third transistor to an output node,
wherein the output circuit sets a change amount in a voltage at the drain of the third transistor in the second operation to be lower than a change amount in a voltage at the output node.

18. The photoelectric conversion apparatus according to claim 17,
wherein the output circuit includes a current minor circuit constituted by a fourth transistor electrically connected to the drain of the third transistor and a fifth transistor having a gate connected to a gate of the fourth transistor,
wherein the current mirror circuit mirrors a current of the fifth transistor to the fourth transistor in the first operation, and
wherein the current mirror circuit mirrors a current of the fourth transistor to the fifth transistor in the second operation.

19. The photoelectric conversion apparatus according to claim 18,
wherein the output circuit includes a connection switch that connects a gate and a drain of the fifth transistor to each other,
wherein the current mirror circuit mirrors the current of the fifth transistor to the fourth transistor when the connection switch is turned on, and
wherein the current mirror circuit mirrors the current of the fourth transistor to the fifth transistor when the connection switch is turned off.

20. The photoelectric conversion apparatus according to claim 19, wherein the control unit includes a capacitance including a first terminal electrically connected to a drain of the fourth transistor and a second terminal electrically connected to the gate of the fourth transistor.

21. A photoelectric conversion system comprising:
the photoelectric conversion apparatus according to claim 1; and
a signal processing apparatus configured to process a signal from the photoelectric conversion apparatus.

22. A photoelectric conversion apparatus comprising:
a photoelectric conversion element;
a first transistor including a gate that receives a signal from the photoelectric conversion element;
a second transistor;
a third transistor that selectively constitutes a first differential pair constituted by the first transistor and the third transistor, and a second differential pair constituted by the second transistor and the third transistor, and includes a gate that receives a reference signal; and
a switch that connects a gate of the second transistor and a drain of the third transistor.

23. The photoelectric conversion apparatus according to claim 22, further comprising:
a switch that connects the gate and the drain of the third transistor.

24. A photoelectric conversion apparatus comprising:
a photoelectric conversion element;
a first transistor including a gate that receives a first signal from the photoelectric conversion element;
a reset transistor that resets a voltage at the gate of the first transistor;
a second transistor; and
a third transistor including a gate that receives a reference signal used for an analog-to-digital conversion,
wherein a comparator including a first differential pair constituted by the first transistor and the third transistor performs a comparison between the first signal and the reference signal, and
wherein a comparator including a second differential pair constituted by the second transistor and the third transistor performs a comparison between a second signal based on the voltage at the gate of the first transistor when the voltage at the gate of the first transistor is reset and the reference signal.

* * * * *